(12) United States Patent
Donovan et al.

(10) Patent No.: US 7,106,756 B1
(45) Date of Patent: Sep. 12, 2006

(54) CUSTOMER RESOURCES POLICY CONTROL FOR IP TRAFFIC DELIVERY

(75) Inventors: Steven Robert Donovan, Plano, TX (US); Diana J. Rawlins, Richardson, TX (US); John K. Gallant, Plano, TX (US)

(73) Assignee: MCI, Inc., Ashburn, VA (US)

( * ) Notice: Subject to any disclaimer, the term of this patent is extended or adjusted under 35 U.S.C. 154(b) by 90 days.

(21) Appl. No.: 09/416,101

(22) Filed: Oct. 12, 1999

(51) Int. Cl.
*H04L 12/56* (2006.01)

(52) U.S. Cl. .................................. 370/468; 370/395.21

(58) Field of Classification Search ................ 370/229, 370/230, 252, 253, 254, 395, 400, 409, 401, 370/468, 419, 352, 399, 428, 418, 414, 429, 370/235, 396, 389, 395.21, 395.41, 477; 709/224, 225, 229, 232, 234
See application file for complete search history.

(56) References Cited

U.S. PATENT DOCUMENTS

| | | | |
|---|---|---|---|
| 5,130,983 A | 7/1992 | Heffner | |
| 5,586,121 A | 12/1996 | Moura et al. | |
| 5,634,012 A | 5/1997 | Stefik et al. | |
| 5,680,116 A | 10/1997 | Hashimoto et al. | |
| 5,745,694 A * | 4/1998 | Egawa et al. | 709/225 |
| 5,825,772 A | 10/1998 | Dobbins et al. | |
| 5,867,571 A | 2/1999 | Borchering | |
| 5,883,894 A | 3/1999 | Patel et al. | |
| 5,889,777 A | 3/1999 | Miyao et al. | |
| 5,903,559 A | 5/1999 | Acharya et al. | |
| 5,903,735 A | 5/1999 | Kidder et al. | |
| 5,909,430 A | 6/1999 | Reaves | |
| 5,930,348 A | 7/1999 | Regnier et al. | |
| 5,933,412 A | 8/1999 | Choudhury et al. | |
| 5,953,338 A * | 9/1999 | Ma et al. | 370/395 |
| 5,960,416 A | 9/1999 | Block | |
| 5,991,292 A * | 11/1999 | Focsaneanu et al. | 370/352 |
| 6,058,113 A | 5/2000 | Chang | |
| 6,073,160 A | 6/2000 | Grantham et al. | |
| 6,088,358 A * | 7/2000 | Tomita et al. | 370/395 |
| 6,097,722 A * | 8/2000 | Graham et al. | 370/395 |
| 6,108,314 A | 8/2000 | Jones et al. | |
| 6,137,777 A * | 10/2000 | Vaid et al. | 370/230 |
| 6,141,686 A | 10/2000 | Jackowski et al. | |

(Continued)

FOREIGN PATENT DOCUMENTS

WO     00/30295     5/2000

OTHER PUBLICATIONS

Braden, R., et al., "Resource ReSerVation Protocol (RSVP): Version 1 Functional Specification," Sep., 1997 (website) ftp://ftp.isi.edu/in-notes/rfc2205.txt.

(Continued)

*Primary Examiner*—Wellington Chin
*Assistant Examiner*—Brenda Pham

(57) ABSTRACT

A method, system, and computer program product for controlling customer resources for Internet protocol (IP) traffic delivery are disclosed. The network utilization of a group of endpoints on a network is tracked to generate group utilization level information corresponding to a current amount of network resource consumption by the group of endpoints. A request for network resources for a data flow for an endpoint in the group is received from a router associated with that endpoint. The request for network resources includes an identifier associated with the endpoint. A determination is made whether to accept the request based on the group utilization level information, the identifier, and a first predetermined profile associated with the group and including a first network utilization limit.

17 Claims, 14 Drawing Sheets

U.S. PATENT DOCUMENTS

| | | | |
|---|---|---|---|
| 6,151,319 | A | 11/2000 | Dommety et al. |
| 6,157,648 | A | 12/2000 | Voit et al. |
| 6,195,355 | B1 | 2/2001 | Demizu |
| 6,205,148 | B1 | 3/2001 | Takahashi et al. |
| 6,298,383 | B1 | 10/2001 | Gutman et al. |
| 6,343,326 | B1 | 1/2002 | Acharya et al. |
| 6,385,203 | B1 | 5/2002 | McHale et al. |
| 6,578,076 | B1 | 6/2003 | Putzolu |
| 6,581,102 | B1 | 6/2003 | Amini et al. |
| 6,584,093 | B1 | 6/2003 | Salama et al. |
| 6,678,264 | B1 | 1/2004 | Gibson |
| 6,678,835 | B1 | 1/2004 | Shah et al. |
| 6,714,987 | B1 | 2/2004 | Amin et al. |
| 6,735,630 | B1 | 5/2004 | Gelvin et al. |
| 6,745,207 | B1 | 6/2004 | Reuter et al. |
| 6,765,927 | B1 | 7/2004 | Martin et al. |
| 6,823,385 | B1 | 11/2004 | McKinnon, III et al. |
| 6,845,106 | B1 | 1/2005 | McKinnon, III et al. |
| 6,854,014 | B1 | 2/2005 | Amin et al. |
| 2001/0025310 | A1 | 9/2001 | Krishnamurthy et al. |
| 2001/0027490 | A1 | 10/2001 | Fodor et al. |
| 2001/0048682 | A1 | 12/2001 | Fichou et al. |

OTHER PUBLICATIONS

Boyle, J. et al., "The COPS(Common Open Policy Service) Protocol, " Aug., 1999 (website) http://www.ietf.org/internet-drafts/drafts-ieft-rap-cops-07.txt.

Boyle, J. et al., "COPS Usage for RSVP," Jun., 1999 (website) http://www.ieft.org/internet-drafts/draft-ieft-rap-cops-05.txt.

Bernet, Y. et al., "A Framework for Differentiated Services," Feb., 1999 (website) http://www.ieft.org/internet-draft-ieft-diffserv-framework-02.txt.

Roberts, E., "The New Class System: Comprehensive Approaches Give Net Managers the Power to Prioritize . . . " (website) http://www.data.com/roundups/class_sytem.html.

IPHIGHWAY Product Overview (website) http://iphighway.com/prod/.

Yavatkar, R. et al., "A Framework for Policy-Based Admission Control," Mar., 1999 (website) http://www.ietf.org/internet-drafts/draft-ietf-rap-framework-03.txt.

Wroclawski, J., "The Use of RSVP with IETF Intergrated Services," Sep., 1997 (website) ftp://ftp.isi.edu/in-notes/rfc2210.txt.

Barzilai et al., "Design and Implementation of an RSVP-Based Quality of Service Architecture for Integrated Services Internet", 1997, IEEE.

Braun, T., "Internet Protocols for Multimedia Communications", Oct. 1997, IEEE Multimedia.

Eriksson et al., "SIP Telephony Gateway on DTM", Jul. 2, 1999, Bachelor's Thesis, Royal Institute of Technology, Sweden.

Rosenberg et al., "Internet Telephony Gateway Location", 1998, IEEE, pp. 488-496.

Schulzrinne et al., "Interaction of Call Setup and Resource Reservation Protocols in Internet Telephony", Jun. 15, 1999, Technical Report.

Schulzrinne et al., "Signaling for Internet Telephony", Feb. 2, 1998, Columbia University, Dept. of Computer Science Technical Report CUCS-005-98.

Schulzrinne, H., "A Comprehensive Multimedia Control Architecture for the Internet", 1997, IEEE, pp. 65-76.

Sinnreich et al., "Interdomain IP Communications with QoS, Authentication and Usage Reporting", Feb. 2000, Internet Draft.

Sinnreich et al., "AAA Usage for IP Telephony with QoS", Mar. 3, 2000, http://www.fys.ruu.nl/~wwwfi/aaaarch/pittsburg/sinnreich/sld001.htm.

Sinnreich et al., "AAA Usage for IP Telephony with QoS", IETF Internet Draft, Jul. 2000.

Wedlund et al., "Mobility Support Using SIP, 1999, Association for Computing Machinery", pp. 76-82.

White, P., "RXVP and Integrated Services in the Internet: A Tutorial", May 1997, IEEE Communications Magazine.

Braden, R., Clark D. and S. Shenker, "Integrated Services in the Internet Architecture: an Overview," RFC 1633, Jul. 1994.

Blake, S., Black, D. Carlson, M., Davies, E., Wang, Z. and W. Weiss, "An Architecture for Differentiated Services," RFC 2475, Dec. 1998.

Rosen, E. and Y. Rekhter, "BGP/MPLS VPNs," RFC 2547, Mar. 1999.

Gleeson, B., Lin., A., Heinanen, J., Finland, T., Armitage, G. and A. Malis, "A Framework for IP Based Virtual Private Networks," RFC 2764, Feb. 2000.

Daniele, M., Haberman, B., Routhier, S. and J. Schoenwaelder, "Textual Conventions for Internet Network Addresses," RFC 2851, Jun. 2000.

Bernet, Y., Ford, P., Yavatkar, R., Baker, F., Zhang, L., Speer, M., Braden, R., Davie, B., Wroclawski, J. and E. Felstaine, "A Framework for Integrated Services Operation over Diffserv Networks," RFC 2998, Nov. 2000.

Ping et al., "Diameter: Policy and Accounting Extension for SIP", Internet Draft, Nov. 15, 1998, <http://www.cs.columbia.edu/sip/drafts/draft-pan-diameter-sip-01.txt>.

Ekstein et al., "AAA Protocols: Comparison Between RADIUS and DIAMETER and COPS", Internet Draft, Aug. 1999, <http://search.ietf.org/internet-drafts/draft-ekstein-roamops-protocol-00.txt>.

Hubaux et al., "The Impact of the Internet on Telecommunication Architectures", Computer Networks, Elsevier Science Publishers B.V., Amsterdam, NL, Feb. 11, 1999, vol. 31, No. 3, pp. 257-273.

Kauser et al., "A Charging Model for Sessions on the Internet", Computers and Communications, 1999 Proceedings IEEE International Symposium on Red Sea, Egypt, Jul. 6-8, 1999, Los Alamitos, CA, USA, IEEE Computer Society, US, Jul. 6, 1999, pp. 32-38.

Wright et al., "IP Telephony vs. ATM: What is There to Discuss?" 1998 1st IEEE International Conference on ATM, ICATM'98 Conference Proceedings, Colmar, France, Jun. 22-24, 1998, IEEE International Conference on ATM, New York, NY, IEEE, US, Jun. 22, 1998, pp. 400-409.

Neilson et al., "Discussion of Bandwith Broker Requirements for Internet2 Qbone Deployment Version 0/7", IEEE Internet Draft, Aug. 1999, pp. 1-30.

Kumar et al., "Beyone Best Effort" Router Architectures for the Differentiated Services of Tomorrow's Internet, IEEE Communications Magazine, IEEE Service Center, Piscataway, NJ, US, vol. 36, No. 5, May 1, 1998, pp. 152-164.

Balmer et al., "A Concept for RSVP Over DiffServ", Computer Communications and Networks, 2000 Proceedings, Ninth International Conference on Las Vegas, NV, US, Oct. 2000, pp. 412-417.

Bernet, "The Complementary Roles of RSVP and Differentiated Services in the Full-Service QOS Network", IEEE Communications Magazine, IEEE Service Center, Piscataway, NJ, US, vol., 39, No. 2, Feb. 2000, pp 154-162.

Mamais et al., "Efficient Buffer Management and Scheduling in a Combined IntServ and DiffServ Architecture: A Performance Study", ATM, 1999 ICATM '99, 199 2$^{nd}$ International Conference on Colmar, France, Jun. 21-23, 1999, Piscataway, NJ, US, IEEE, US, Jun. 21, 1999, pp. 236-242.

Detti et al., "Supporting RSVP in a Differentiated Service Domain: An Architectural Framework and a Scalability Analysis", ICC '99, 1999 IEEE International Conference on Communications, Conference Record, Vancouver, CA, Jun. 6-10, 1999, IEEE International Conference on Communications, New York, NY: IEEE, US, vol. 1, Jun. 6, 1999, pp. 204-210.

Hussmann et al., "An Edge Device for Supporting Internet Integrated Services Over Switched ATM Networks", Interoperable Communications Network, Baltzer Science Publishers, Bussum, NL, Sep. 1998, pp 321-330.

Brazilai et al., "Design and Implementation of an RSVP-Based Quality of Service Architecture for Integrated Services Internet", Distributed Computing Systems, 1997, Proceedings of the 17th International Conference on Baltimore, MD, US, May 27-30, 1997, Los Alamitos, CA, US, IEE Computer Soc., US, May 27, 1997, pp. 543-551.

Handley et al., "SIP: Session Initiation Protocol", IETF RFC 2543, Mar. 31, 1999, pp. 7-17, http://www.lett.org/rtc/rtc2543.txt.

Sinnreich et al., "AAA Usage for IP Telephony with QoS", Internet Draft, Jan. 2001, pp. 1-20.

Stojsic et al., "Formal Definition of SIP Proxy Behavior", 2001 IEEE, pp. 289-292.

Salsano et al., "QoS Control by Means of COPS to Support SIP-Based Applications", Mar./Apr. 2002, pp. 27-33.

Flykt et al., "SIP Services and Interworking with Ipv6", Mar. 2001, pp. 186-190.

Arao et al., "Component-Based Policy Deployment for Service Level Differentiation in Converging Communication Networks." IEEE International Conference on Communications. Jun. 10, 1999, vol. 2, pp. 1388-1392.

Mascolo et al., "An XML based Programmable Network Platform", Proc. of the ICSE Workshop on Software Engineering and Mobility. Toronto Canada. May 2001.

Beck et al., "Scheduling Alternative Activities", American Association for Artificial Intelligence, 1999.

Tsaoussidis et al., "A CORBA-based Application Service Middleware: Archetectue and Implementation", *4th IEEE Symposium on Computers and Communications*, IEEE ISCC '99, pp. 130-136, IEEE Computer Society Press, Red Sea, Egypt, Jul. 1999.

* cited by examiner

CUSTOMER RESOURCES POLICY CONTROL FOR IP TRAFFIC DELIVERY

BACKGROUND OF THE INVENTION

1. Field of the Invention

The present invention relates generally to the control of customer utilization of network resources, and more specifically to tracking customer resource utilization on a network and enforcing a customer utilization policy.

2. Discussion of the Background

Wide area networks (WANs), such as the Internet, can link many computers through a mesh of possible connections. The Internet is a collection of networks and gateways that communicate with one another using the TCP/IP suite of protocols. TCP/IP protocols and architecture are described in Liu et al., "Managing Internet Information Services," O'Reilly & Associates, Inc., 1994; Comer, "Internet Working with TCP/IP Volume I: Principles, Protocols, and Architecture," $2^{nd}$ ed., Prentice-Hall, Inc., 1991; Comer and Stevens, "Internet Working with TCP/IP Volume II: Design, Implementation, and Internals," Prentice-Hall, Inc., 1991; Comer and Stevens, "Internet Working with TCP/IP Vol. III: Client-Server Programming and Applications," Prentice-Hall, Inc., 1993; each of which is incorporated herein by reference.

Internet gateways are devices that provide connections between an Internet backbone and another network, such as a local area network (LAN) of a user. Internet gateways are typically dedicated computers or routers. A router is an intermediary device on a communications network that receives transmitted messages and forwards them to their correct destinations over the most efficient available route. An Internet gateway is considered a node on the Internet, and generally performs data translation, data conversion, message handling, and protocol conversion between an Internet backbone and another network.

A backbone is a high speed network that connects local and regional networks of computers. An Internet backbone includes at least one connection point where it exchanges packets with other Internet backbones. Today, many commercial Internet providers, such as MCI Worldcom, have their own Internet backbones that span thousands of miles using microwave relays and dedicated lines.

Computer networks such as the Internet have created widespread efficiencies in the dissemination of information. However, the speed at which data is transmitted and received over the Internet can vary considerably. Data flows over even the largest communications lines can be made painstakingly slow or become interrupted due to bandwidth limitations. As the commercial and private use of networks such as the Internet continues to grow, the problem of limited bandwidth becomes greater.

Several solutions to the bandwidth limitation problem have been suggested. One such solution is simply to provide a network with extra bandwidth capability. This solution, known as over provisioning, requires that a network be provided with more communications lines and/or communications lines with greater bandwidth capability. Over provisioning is very costly, however, and wastes bandwidth resources. Moreover, even an over provisioned network may become under provisioned if the utilization of the network someday exceeds the bandwidth capability of the network.

Another solution to the bandwidth limitation problem is to control network resources on a per router interface basis. In other words, each router is provided with a utilization limit, and when the utilization limit is exceeded, the router will accept no more data flow requests. A similar solution is to use IETF (Internet Engineering Task Force) differentiated service classes. The control of resources based on classes is discussed in Roberts, "The New Class System," October 1997, http://www.data.com/roundups/class_system.html, which is incorporated herein by reference.

Differentiated services aggregates the packet traffic into classes and provides quality of service based on the class. It is based on the marking of the packet with a differentiated services code point (DSCP). The packet is classified at the router interface according to the DSCP by a differentiated services router and receives at each differentiated services router the quality of service treatment configured for the DSCP.

Both the control of resources based on the router interface and the control of resources based on service classes are too coarse. Specifically, these solutions track the current resources used on a per router interface basis or on a per class basis only. Consequently, these solutions do not prevent network resources from being consumed by traffic intensive applications, which deprive other applications access to these resources.

Another solution to the bandwidth limitation problem is to control network resources based on the RSVP (Resource Reservation Setup Protocol) per session signaling mechanism. RSVP is a communications protocol that can be run on a network router. RSVP is designed to provide for bandwidth on demand. Using RSVP protocol, a remote receiver or endpoint requests that a specific amount of bandwidth be reserved by a router for a data flow or data stream. The router sends back a message indicating whether or not the request has been granted. Thus, RSVP provides a reservation which is a guarantee of network resources on an individual flow basis. This technique, however, is too fine. Consequently, network resources are micro-managed on a per flow level and are not managed on a customer level. Management on a per flow level is undesirable since network resources are typically purchased on a customer level.

Yet another solution to the bandwidth limitation problem is to deny network resource access based on the IP address of the endpoint seeking to transmit and/or receive a data flow. This solution is extremely coarse, however, as it provides an all or nothing approach to resource allocation.

SUMMARY OF THE INVENTION

Accordingly, one object of this invention is to provide a flexible technique to control and track the assignment and usage of network resources.

It is another object of the present invention to control network resource consumption on a customer basis.

These and other objects are achieved according to the present invention by providing a novel method, system, and computer program product for controlling customer resources for network traffic delivery. The network utilization of a group of endpoints is tracked to generate group utilization level information corresponding to a current amount of network resource consumption by the group of endpoints. A request for network resources for a data flow for an endpoint in the group is received from a router associated with that endpoint. The request for network resources includes an identifier associated with the endpoint. A determination is made whether to accept the request based on the group utilization level information, the identifier, and a first predetermined profile associated with the group and including a first network utilization limit.

If the group of endpoints is a customer, then the present invention makes it possible to track the network utilization of the customer and to determine whether to accept requests to allocate network resources to the customer based on the tracked network utilization of the customer. Preferably, the determination whether to accept requests from the customer is made by applying a policy rule to determine whether the group exceeds one or more network utilization limits. Additionally, endpoints can be divided into reserved bandwidth service logical access points (RLAPs) which are formed by one or more groups. The network utilization of the RLAPs can be tracked in the same manner as the groups, and determinations whether to accept requests to reserve network resources can be made based on RLAP utilization level information in addition to the group utilization level information.

When requests for network resources are accepted, the group utilization level information and the RLAP utilization level information is updated to reflect the increase in the network utilization of the corresponding group and RLAP. Likewise, when a data flow ceases, the utilization level information is adjusted to reflect the decrease in network utilization by the corresponding RLAP and group. Thus, network resources can be flexibly managed on a customer level.

Network utilization can be tracked at a policy decision point that receives requests to reserve bandwidths from a router. The router is preferably a policy enforcement point (PEP) using the IETF COPS (common open policy service)-RSVP protocol or a COPS enabled RSVP router. Thus, the present invention may be conveniently implemented as an extension of the RSVP signaling process.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
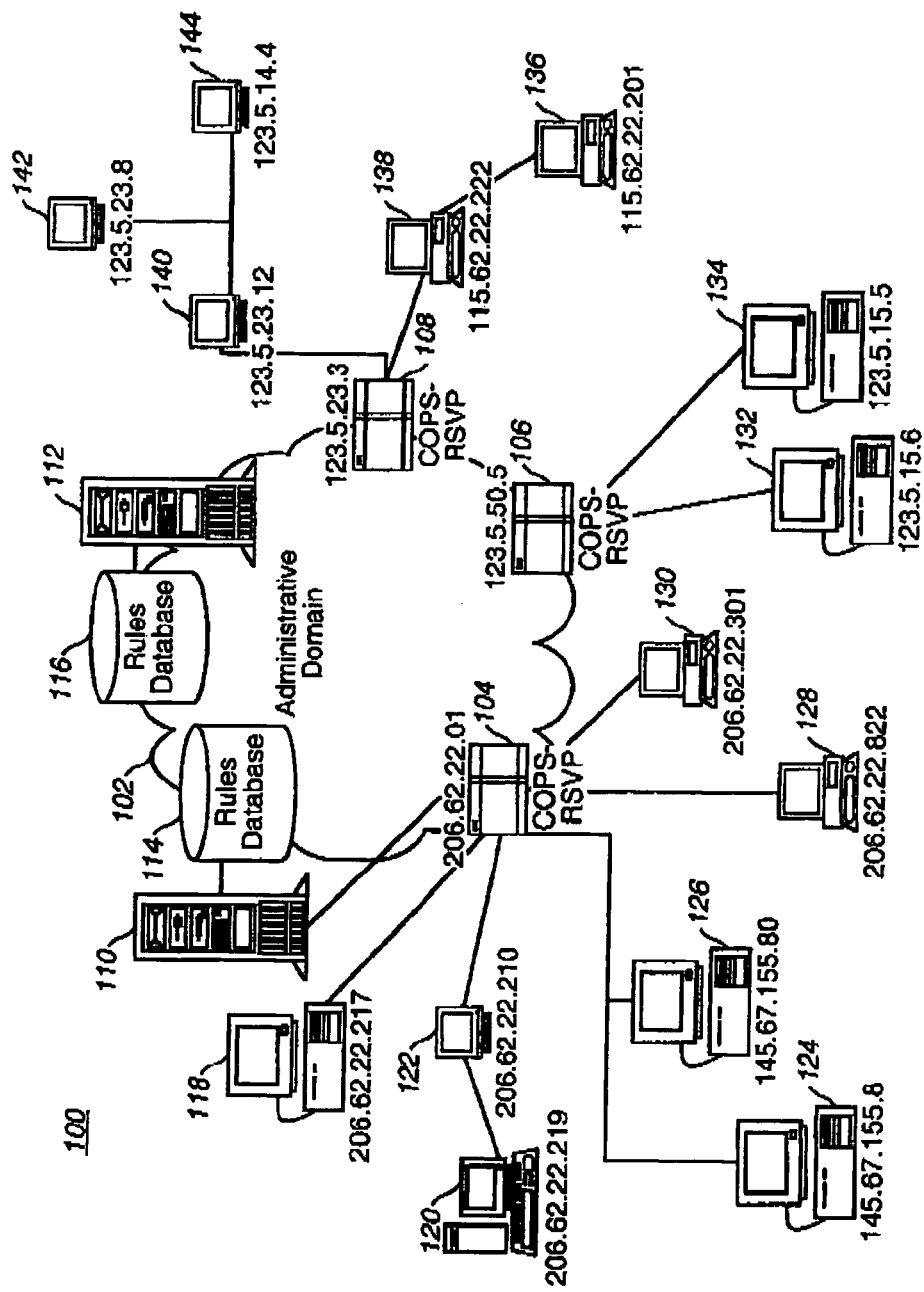
FIG. 1A is a schematic illustration of a computer network on which customer resources are controlled in accordance with an embodiment of the present invention.

Referring now to the drawings, wherein like reference numerals designate identical or corresponding parts throughout the several views, and more particularly to FIG. 1A thereof, an illustrative computer network 100 implementing the present invention is shown. The computer network 100 includes an administrative domain 102; policy enforcement points (PEPS) 104, 106, and 108; policy decision points (PDPs) 110 and 112; rules databases 114 and 116; and endpoints 118, 120, 122, 124, 126, 128, 130, 132, 134, 136, 138, 140, 142, and 144. For ease of reference, a glossary of terms and abbreviations is provided herewith as Appendix A.

The administrative domain 102 is a collection of network elements under the same administrative control and grouped together for administrative purposes. The administrative domain 102 uses permanent connections, such as cables, and/or temporary connection made through telephone, modem, or other communication links to permit communication between various computers and other devices linked to the administrative domain 102. The administrative domain 102 may include computers and associated devices connected by communication facilities. For example, the administrative domain 102 may be the vBNS (very high-performance backbone network services) reserve bandwidth network or any other nationwide network that supports high-performance, high-bandwidth research applications. Alternatively, the administrative domain 102 may be any backbone network (e.g., the Internet), a portion of the Internet, packet switched network, or any other wide area network (WAN).

The PEPs 104, 106, and 108 are routers or packet switches where policy decisions are enforced. These policy decisions relate to whether a path is to be established. As used herein, "a policy" is a combination of rules defining criteria for network resource access and usage. A path is a link between two nodes in a network, for example, a link between the endpoint 118 and the endpoint 144. The endpoints send the PEPs requests to establish paths using RSVP (Resource Reservation Setup Protocol) signaling or any other suitable form of signaling, protocol, or communications language. RSVP signaling is described in Braden, Zhang, Berson, Herzog, and Jamin, "Resource ReSerVation Protocol (RSVP)," Version 1 Functional Specification, September 1997, ftp://ftp.isi.edu/in-notes/rfc2205.txt, which is incorporated herein by reference. The IP address of each of the PEPs 104, 106, and 108 is shown adjacent each PEP in FIG. 1A.

The PEPs 104, 106, and 108 are preferably COPS (common open policy service) enabled RSVP routers programmed to exercise policy-based control over RSVP usage or any other device suitable for enforcing policy decisions. A COPS enabled RSVP router preferably includes a routing function for classifying traffic and performs RSVP protocol functions for admission control, policy control, and packet classification, for example. The policy control RSVP function causes the router to function as a policy enforcement point (PEP), which performs operations for enforcing policy server decisions with respect to a specific data flow request using the COPS protocol.

COPS is a query and response protocol that can be used to exchange policy information between a policy server (e.g., PDP 112) and its clients (e.g., PEPs 106,108). Examples of the COPS protocol are found in Boyle, Cohen, Durham, Herzog, Rajan, and Sastry, "The COPS (Common Open Policy Service) Protocol," Internet Draft, Aug. 16, 1999, http://www.ietf.org/internet-drafts/draft-ietf-rap-cops-07.txt; and in Boyle, Cohen, Durham, Herzog, Rajan, and Sastry, "COPS Usage for RSVP," Internet Draft, Jun. 14, 1999, http://www.ietf.org/internet-drafts/draft-ietf-rap-cops-rsvp.05.txt; both of which are incorporated herein by reference.

The PDPs 110, 112 are servers, for example, a DEC Alpha server model DS10 or any other suitable device, such as a computer or policy server on which policy decisions can be made. The PDP 110 communicates with the PEP 104, and the PDP 112 communicates with the PEP 106 and the PEP 108. Preferably, the PDPs 110 and 112 and the PEPs 104, 106, and 108 communicate using a version of the COPS protocol.

The rules databases 114 and 116 are memories, for example, random access memories (RAMs), for storing administrative policy rules for limiting access to the administrative domain 102. The administrative policy rules are used by the PDP to make policy decisions. The rules databases 114 and 116 may be internal or external to the PDPs 110 and 112.

The endpoints 118–144 are computers connected to the administrative domain 102. Endpoints 118–144 are configured to send and/or receive data flows to one another via the administrative domain 102. The endpoints 118–144 may access the administrative domain 102 by modem, dial-up networking, high-speed telephone circuits, and/or any other suitable method for accessing the administrative domain 102. The endpoints 118–144 connect to the administrative domain 102 through one or more of the routers 104, 106, and 108. The IP address of each of the endpoints 118-144 is shown adjacent to each endpoint.

Figure 1B:
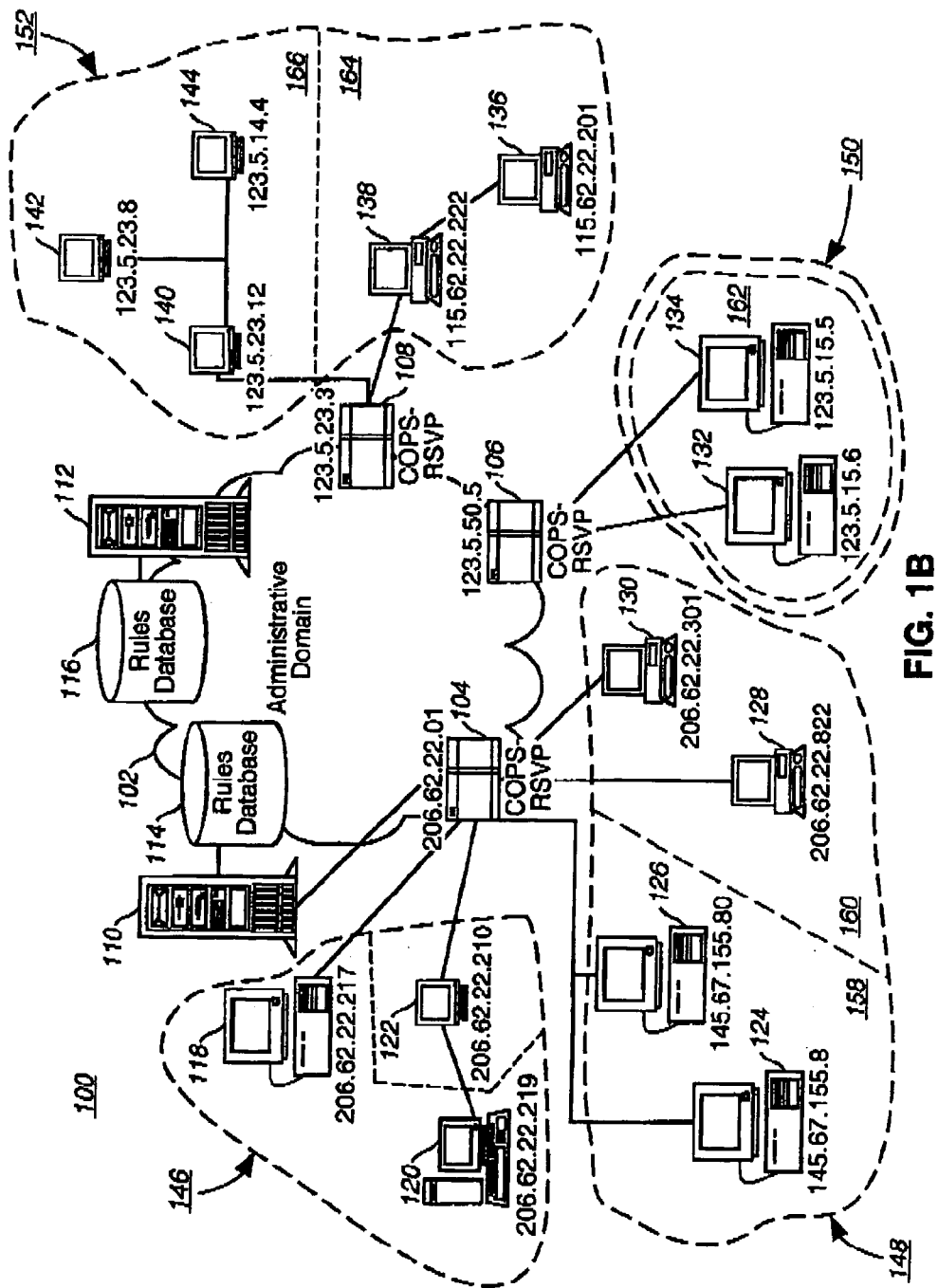
FIG. 1B shows how the endpoints in FIG. 1A can be divided into reserved bandwidth service logical access ports (RLAPs) and groups.

FIG. 1B shows how the endpoints 118–144 of the computer network 100 can be divided into RBS logical access ports (RLAPs) 146, 148, 150, and 152. Each of the RLAPs is associated with at least one of the PDPs 110, 112. Further, the endpoints within each RLAP are subdivided into groups 154, 156, 158, 160, 162, 164, and 166. The group 154 is associated with the RLAP 146 and the PDP 110, the group 156 is associated with the RLAP 146 and the PDP 110, the group 158 is associated with the RLAP 148 and the PDP 110, the group 160 is associated with the RLAP 148 and the PDP 110, the group 162 is associated with the RLAP 150 and the PDP 112, the group 164 is associated with the RLAP 152 and the PDP 112, and the group 166 is associated with the RLAP 152 and the PDP 112. The association of endpoints into RLAPS and groups can be determined in any logical manner, for example, by using geographic proximity or network topology. If the RLAPS and/or groups correspond to customers, then network resources can advantageously be tracked and managed on a customer level.

It is emphasized that the computer network 100 of FIGS. 1A and 1B are for exemplary purposes only, as many variations and permutations of the hardware used to implement the present invention will be readily apparent to one having ordinary skill in the art. To implement these variations, a single computer (e.g., the computer 1500 of FIG. 15) may be programmed to perform the special purpose functions of two or more of any of the devices shown in FIGS. 1A and 1B. For example, a single computer could be programmed to function as both a PEP and a PDP. On the other hand, by using distributed processing techniques, for example, two or more programmed computers, may be substituted for any one of the devices shown in FIGS. 1A and 1B.

Moreover, each endpoint may be associated with more than one group and RLAP. This may occur where an endpoint is authorized to access the administrative domain through multiple PEPs. For example, if the endpoint 136 were authorized to access the administrative domain 102 through the PEP 106 and the PEP 108, the endpoint 136 would be associated with the group 162 and the RLAP 150 when it accesses the administrative domain via the PEP 106. On the other hand, the endpoint 136 would be associated with the group 166 and the RLAP 152 when it accesses the administrative domain via the PEP 108.

The present invention stores information relating to the endpoints on the computer network, the resource utilization of RLAPs and groups, profile data for the RLAPs and groups, and the data flows occurring through the administrative domain 102. This information is stored in one or more memories such as a hard disk, optical disk, magneto-optical disk, and/or RAM, for example. One or more databases, such as the rules databases 114 and 116, may store the information used to implement the present invention. The databases are organized using data structures (e.g., records, tables, arrays, fields, and/or lists) contained in a memory such as a hard disk, optical disk, magneto-optical disk, and/or RAM, for example.

FIGS. 2 through 8 depict data structures used for implementing a customer resources policy control for IP traffic delivery. These data structures are used by the PDPs 110 and 112 to make policy decisions, which are enforced by the PEPs 104, 106, and 108. The data structures shown in FIGS. 2 through 8 are stored in the respective rules databases 114 and 116 of the PDPs 110 and 112, or any other suitable storage device. The information stored in the data structures includes identifiers for linking endpoints with their corresponding RLAPs and groups as well as utilization level information for the RLAPs and groups and predetermined profiles for the RLAPs and groups.

Figure 2:
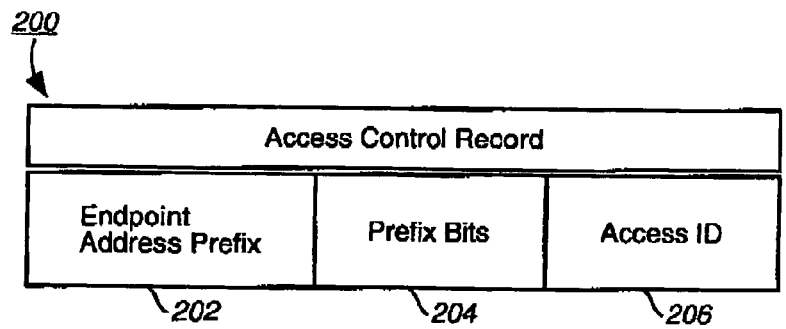
FIG. 2 is a drawing of an access control record for storing information associating an IP address of an endpoint of the computer network in FIG. 1B with a corresponding access ID.

FIG. 2 shows an access control record 200 that includes a field 202 for storing an endpoint address prefix, a field 204 for storing prefix bits, and a field 206 for storing an access ID. An access control record 200 is stored for each endpoint authorized to access the administrative domain 102 via one of the PEPs 104, 106, and 108.

The endpoint address prefix is the IP address prefix of an endpoint authorized to access the administrative domain 102 to send a data flow. The prefix bits are the number of significant bits of the IP address prefix used to determine whether a sender is authorized to access the administrative domain 102. The access ID is a link to a list of all the PEPs for each endpoint address prefix for which the sender is authorized to access the administrative domain 102. An ingress point is the access point to the administrative domain 102 for an endpoint that is sending a data flow from one endpoint to another endpoint. The access control records stored at a particular PDP may be organized into a single access control table.

Figure 3:
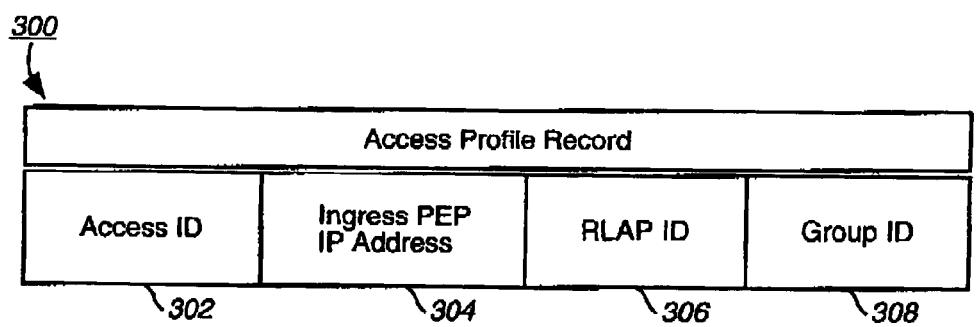
FIG. 3 is a drawing of an access profile record for storing information associating an endpoint of the computer network in FIG. 1B with its respective policy enforcement points (PEPs), RLAPs, and groups.

FIG. 3 shows an access profile record 300. An access profile record 300 is stored for every access ID. Multiple access profile records may be stored in a single access profile table. The access profile record 300 includes a field 302 for storing an access ID, a field 304 for storing ingress PEP IP addresses, a field 306 for storing an RLAP ID, and a field 308 for storing a group ID. The PEP IP addresses indicate which PEPs are authorized ingress points for the endpoint corresponding to the access ID. The RLAP ID indicates the RLAP associated with the access ID and the corresponding endpoint. For example, the RLAP 146 is associated with the endpoint 118. The group ID indicates the group associated with the access ID and the corresponding endpoint. For example, the endpoint 118 is associated with the group 154.

Figure 4:
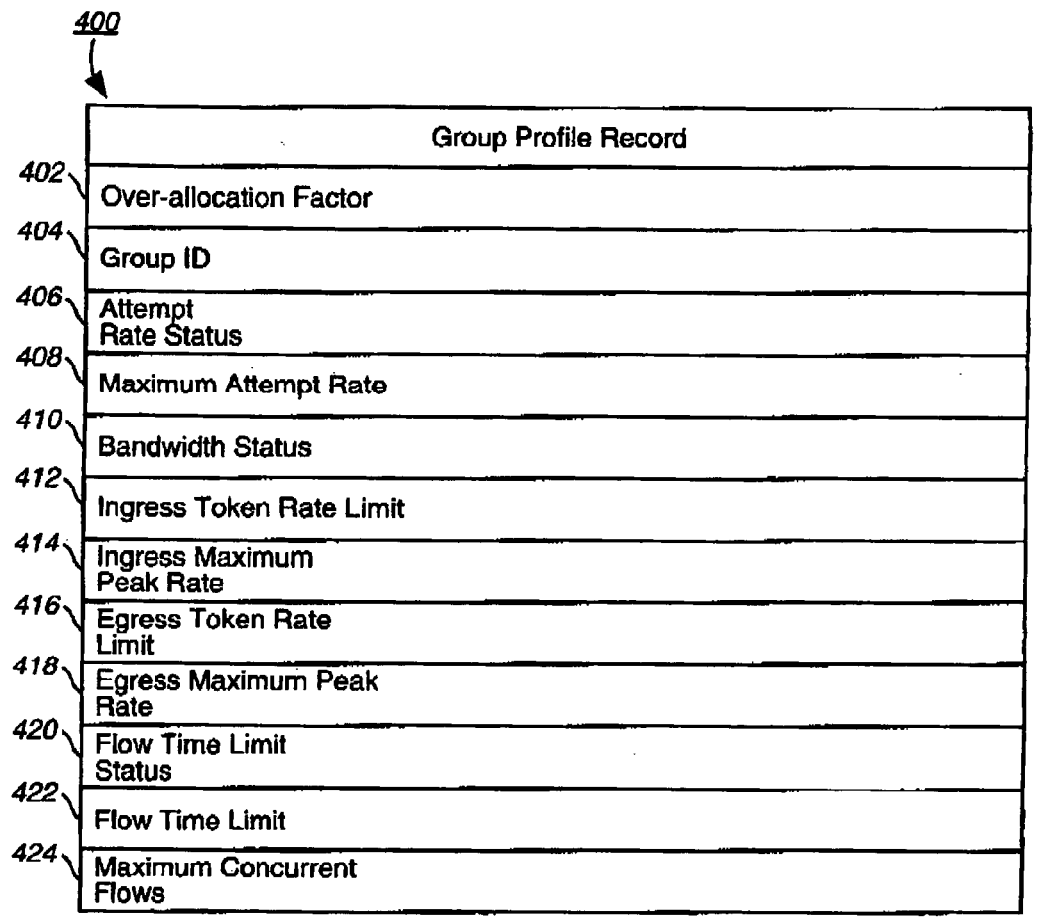
FIG. 4 is a drawing of a group profile record for storing information relating to the network utilization limits of one of the groups in FIG. 1B.

FIG. 4 shows a group profile record 400 for storing predetermined information about one of the groups 154, 156, 158, 160, 162, 164, and 166. The predetermined information includes maximum network utilization level information for the group. A group profile record 400 exists for each group, and the group profile records may be stored together in a group profile table. The group profile record 400 includes a field 402 for storing an over-allocation factor, a field 404 for storing group IDs, a field 406 for storing the attempt rate status of each group, a field 408 for storing the maximum attempt rate for each group, a field 410 for storing the bandwidth status for each group, a field 412 for storing the ingress token rate limit for each group, a field 414 for storing the ingress maximum peak rate, a field 416 for storing the egress token rate limit, a field 418 for storing the egress maximum peak rate, a field 420 for storing the flow time limit status, a field 422 for storing the flow time limit, and a field 424 for storing the maximum concurrent flows.

The group ID identifies the group corresponding to the group profile record 400. The attempt rate status identifies whether the attempt rate rule (discussed below with respect to FIG. 14) is active for the group. The maximum attempt rate is the maximum number of times that a group can attempt to start a data flow over the administrative domain 102 in a given time period. The bandwidth status indicates whether the bandwidth rule is active for the group. The ingress token rate limit is the maximum ingress token rate, in terms of bandwidth, that can be requested by a group. The ingress maximum peak rate is the maximum ingress peak rate, in terms of bandwidth, allowed for existing data flows from a group. The egress token rate limit is the maximum egress token rate, in terms of bandwidth, that can be requested by a group for a data flow. The egress maximum peak rate limit is the maximum egress peak rate, in terms of bandwidth, allowed for an existing data flows to a group. The flow time limit status indicates whether the flow time limit rule (discussed below with respect to FIG. 14) is active. The flow time limit is the maximum duration that a flow from the group may exist. Alternatively, the flow time limit may be the maximum duration that a flow to the group may exist or the maximum duration that a flow to and from the group may exist. The maximum concurrent flows is the number of data flows that the group is permitted to have at one time. The maximum number of data flows may be separately monitored for both ingress data flows and egress data flows.

Figure 5:
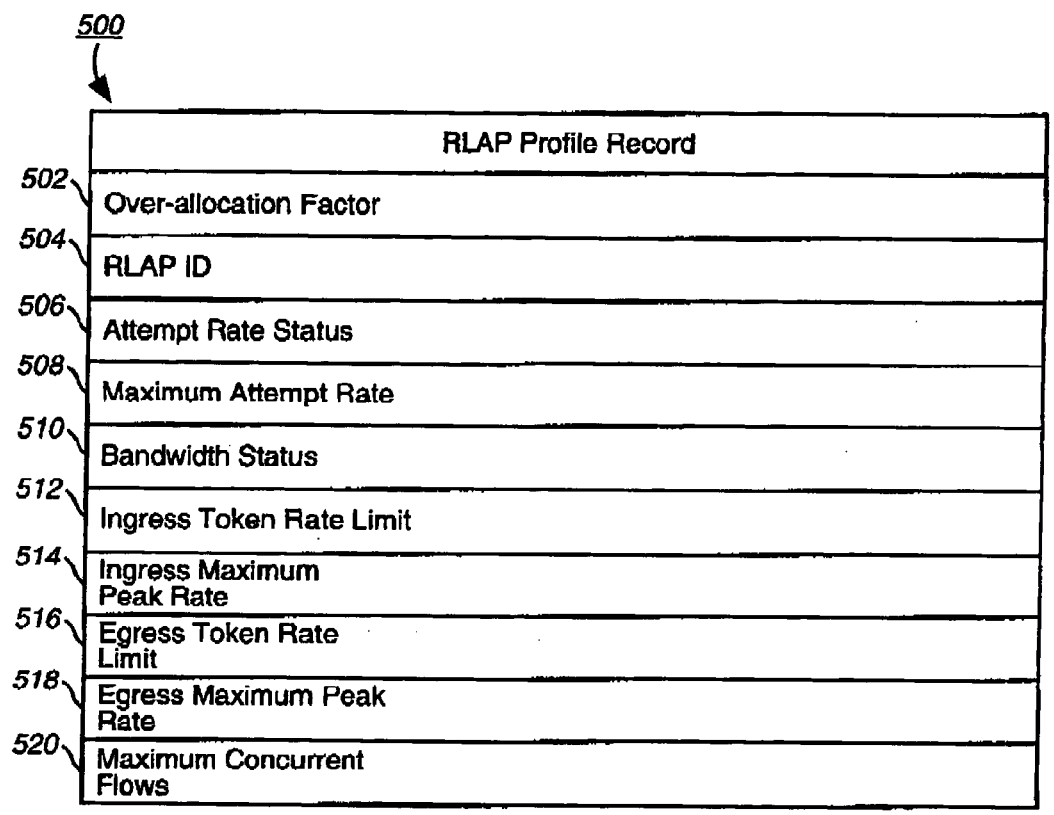
FIG. 5 is a drawing of an RLAP profile record for storing information relating to the network utilization limits of one of the RLAPs in FIG. 1B.

FIG. 5 shows an RLAP profile record 500. An RLAP profile record exists for each RLAP, and multiple RLAP records may be stored in a single RLAP profile table. The RLAP profile record 500 includes a field 502 for storing an over-allocation factor, a field 504 for storing an RLAP ID, a field 506 for storing an attempt rate status, a field 508 for storing a maximum attempt rate, a field 510 for storing a bandwidth status, a field 512 for storing an ingress token rate limit, a field 514 for storing an ingress maximum peak rate, a field 516 for storing an egress token rate limit, a field 518 for storing an egress maximum peak rate, and a field 520 for storing maximum concurrent flows. The information stored in the RLAP record is analogous to the information stored in the group profile record 400. For example, the maximum attempt rate in field 508 is the maximum number of times that an RLAP can attempt to initiate a data flow over the administrative domain 102.

Figure 6:
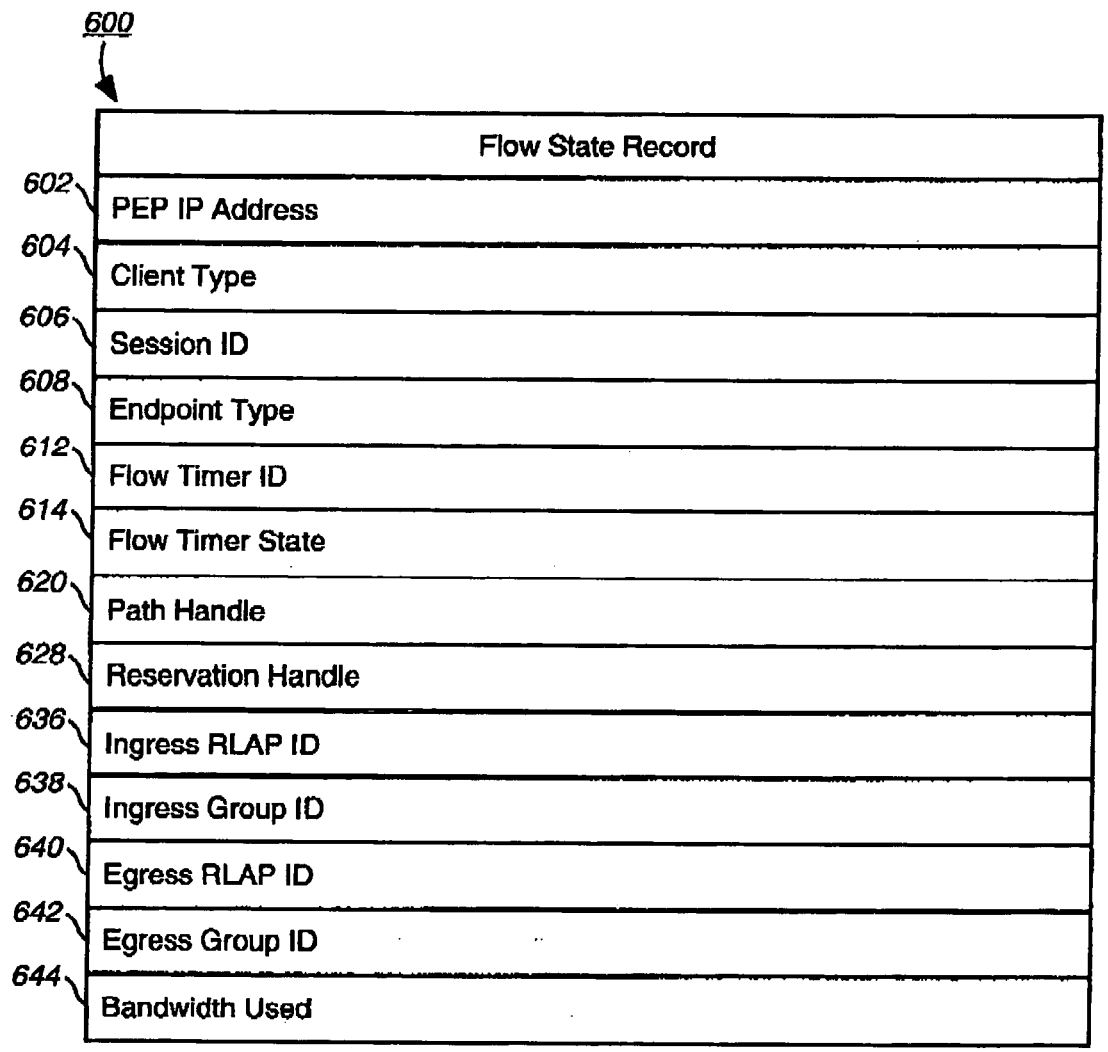
FIG. 6 is a drawing of a flow state record for storing information about a current data flow between endpoints of the computer network in FIG. 1B.

FIG. 6 shows a flow state record 600. A flow state record is created for each data flow across the administrative domain 102 from one endpoint (i.e., the sender) to another endpoint (i.e., the destination). The flow state records 600 may collectively be stored in a flow state table. The flow state record 600 includes a field 602 for storing a PEP IP address, a field 604 for storing the client type, a field 606 for storing a session ID, a field 608 for storing endpoint types, a field 612 for storing a flow timer ID, a field 614 for storing a flow timer state, a field 620 for storing a path handle, a field 628 for storing a reservation handle, a field 630 for storing a reservation state status, a field 636 for storing an ingress RLAP ID, a field 638 for storing an ingress group ID, a field 640 for storing an egress RLAP ID, a field 642 for storing an egress group ID, and a field 644 for storing the bandwidth used by the flow.

The PEP IP address is the IP address for the ingress PEP for the flow. The client type identifies the type of RSVP client, (e.g., a router using COPS/RSVP protocol). The session ID identifies the session. The endpoint type identifies whether the endpoint associated with the PEP is an undetermined endpoint, an ingress endpoint, an egress endpoint, or a combined ingress and egress endpoint. The flow timer ID identifies the flow timer associated with the flow state record 600. The flow timer tracks the duration of the data flow associated with the flow state record 600. The flow timer state indicates whether the flow timer associated with the flow state record 600 is inactive or active. The path handle identifies the installed path state for the data flow. The reservation handle identifies the installed reservation state for the data flow.

The ingress RLAP ID identifies the RLAP associated with the sender at ingress. The ingress group ID identifies the group ID associated with the sender at ingress. The egress RLAP ID identifies the RLAP associated with the destination at egress. The egress group ID identifies the group associated with the destination at egress. For example, if a successful path were formed for a data flow from the endpoint 118 to the endpoint 144, the PDP 110 would be the ingress PDP, and the PDP 112, would be the egress PDP. Likewise, the PEP 104 would be the ingress PEP, and the PEP 108 would be the egress PEP.

The bandwidth used is the allocated, adjusted bandwidth request for the data flow. Thus, the bandwidth used is the amount of bandwidth resources that the flow is consuming. The bandwidth may be measured as the data flow in bits per second.

Figure 7:
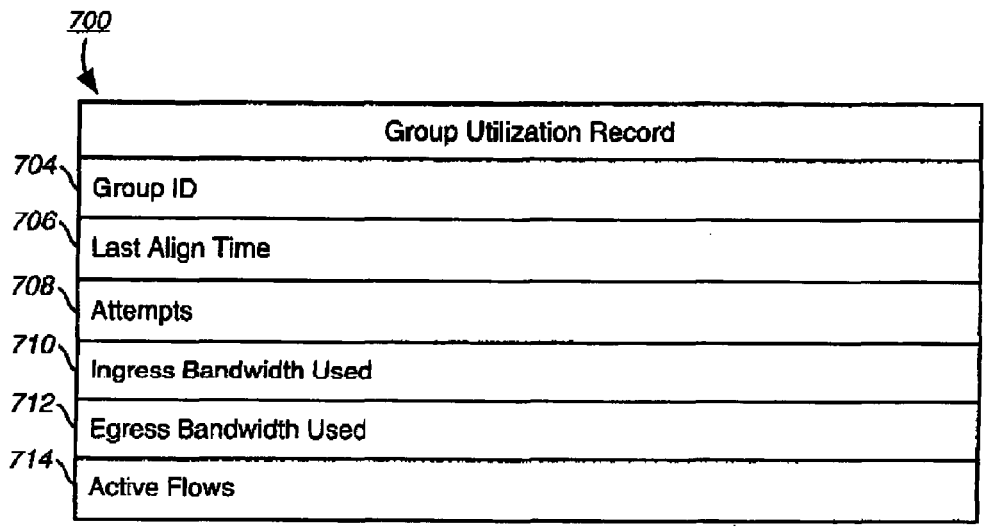
FIG. 7 is a drawing of a group utilization record for storing network utilization level information for one of the groups in FIG. 1B.

FIG. 7 shows a group utilization record 700 for storing information of the network utilization (i.e., resource consumption) of a group associated with a PDP. A group utilization record for each group associated with a PDP is stored in a database associated with the PDP (e.g., in the rules database 114 associated with the PDP 110). Each group utilization record 700 includes a field 704 for storing the group ID, a field 706 for storing the last align time, a field 708 for storing attempts, a field 710 for storing the ingress bandwidth used, a field 712 for storing the egress bandwidth used, and a field 714 for active flows. The group ID identifies the group. The last align time is the time of the last align based on the ANSI time function. The last align time is used by the attempt rate rules, which are described below with regard to FIG. 14. The last align time is the time that the attempt count was last reset. The attempts is the number of flow request attempts occurring during the time period for the group. The time period is the interval during which the attempts are being counted. The attempt rate is the number of attempts over time. The time period is a predetermined value and is commonly set to 10 seconds. The ingress bandwidth used is the aggregate ingress bandwidth currently in use by the group. The egress bandwidth used is the aggregate egress bandwidth currently in use by the group. Accordingly, it can be seen that both the ingress and egress bandwidth are separately tracked for each group. Separate tracking of the ingress and egress bandwidth advantageously permits bandwidth limits to be tailored to the requirements of different customers. The active flows is the number of data flows currently active for the group.

Figure 8:
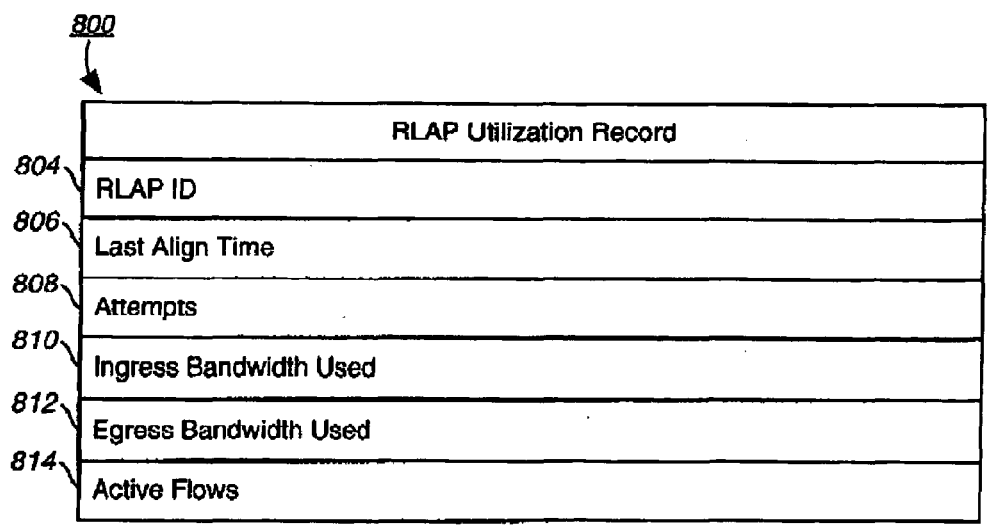
FIG. 8 is a drawing of an RLAP utilization table for storing RLAP utilization level information for one of the RLAPs in FIG. 1B.

FIG. 8 shows an RLAP utilization record 800 for storing information of network resource consumption of an RLAP associated with a PDP. An RLAP utilization record 800 for each RLAP associated with a PDP is stored in a database associated with the PDP (e.g., in the rules database 114 associated with the PDP 110). The RLAP utilization records for a PDP may be stored in a single table. The RLAP utilization record 800 includes a field 804 for storing the RLAP ID, a field 806 for storing the last align time, a field 808 for storing attempts, a field 810 for storing the ingress bandwidth used, a field 812 for storing the egress bandwidth used, and a field 814 for storing active flows. The RLAP ID identifies the RLAP corresponding to the RLAP utilization record 800. The last align time is the time of the last align for the RLAP based on the ANSI time function. The last align time at the RLAP level is used when the attempt rate rule is applied and is analogous to the last align time used at the group level. The attempts identify the number of flow request attempts occurring during a predetermined sampling period. The ingress bandwidth used is the aggregate ingress bandwidth currently in use by the RLAP. The egress bandwidth used is the aggregate egress bandwidth currently in use by the RLAP. Thus, the RLAP utilization record 800 is similar to the group utilization record 700 in that both the ingress bandwidth and the egress bandwidth are tracked. The active flows identifies the number of flows currently active for the RLAP.

Figure 9:
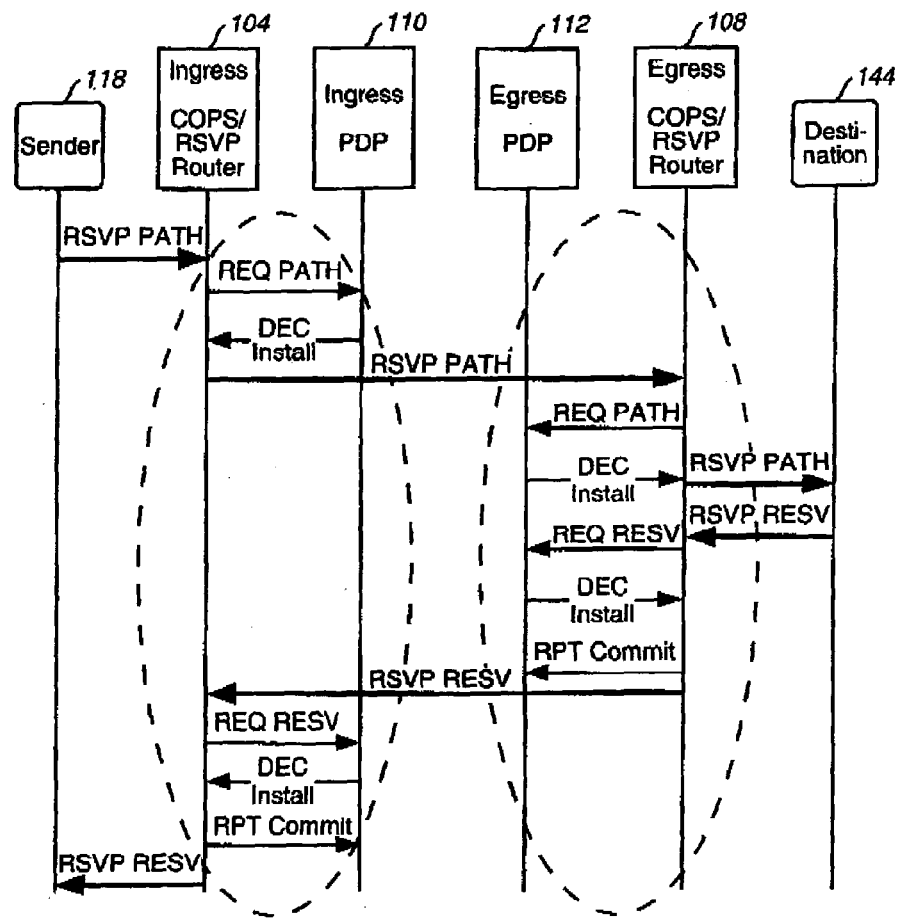
FIG. 9 is a schematic illustration showing how a data flow is established between two endpoints in the computer network in FIG. 1B, using RSVP signaling.

FIG. 9 is a schematic illustration showing exemplary message exchanges for establishing a flow from a sender to a destination. The sender of the flow is the endpoint 118 and the destination of the flow is the endpoint 144. The message exchanges shown in FIG. 9 use RSVP and COPS signaling protocols; however, any suitable protocols may be used since the information used by the PDPs to implement the present invention may be encapsulated in any suitable protocol message. Thus, if the PDPs can associate the endpoints making requests with their respective groups and RLAPs and obtain information corresponding to the amount of network resources consumed and/or to be consumed by the flow, any protocol language, signaling technique, or other method of communication may be employed.

As shown in FIG. 9, the PEPs 104 and 108 are COPS enabled RSVP routers. Thus, the PEPs 104 and 108 use RSVP signaling protocols to communicate with the endpoints 118 and 144, respectively, and the PEPs 104 and 108 use RSVP and COPS protocols to communicate with the PDPs 110 and 112, respectively.

To initiate the data flow, the endpoint 118 issues a path request (RSVP PATH) with an RSVP SENDER_TSPEC object, which describes the requested token rate and peak rate traffic characteristics for the requested flow. The RSVP PATH is received by the PEP 104, which becomes the ingress access point. The PEP 104 issues a Request message type PATH (REQ PATH) to the PDP 110. The PDP 110 determines that the flow is an ingress flow relative to the PDP 110, applies policy rules (described below with reference to FIG. 14), installs ingress path state, and returns a decision command to install the flow (DEC Install) to the PEP 104 if none of the policy rules are violated. Next, the PEP 104 forwards the RSVP PATH downstream to the PEP 108, which serves as the egress access point in this example. Upon receiving the RSVP Path from the PEP 104, the PEP 108 issues REQ PATH to the PDP 112, which is the egress PDP in this example. The PDP 112 determines that the flow is an egress flow relative to the PDP 112, applies policy rules, and installs egress path state. Then the PDP 112 returns DEC Install to the PEP 108 if none of the policy rules are violated. Then, the PEP 108 forwards the RSVP PATH downstream to the endpoint 144. If a policy rule is determined to be violated by the PDP 110 or the PDP 112, then the PDP at which the violation occurred will not issue a DEC Install to the corresponding PEP. Instead, the PDP will issue a DEC Remove to the corresponding PEP, and consequently, the RSVP PATH will not be forwarded from that PEP.

Assuming that the RSVP PATH was successfully forwarded from the endpoint 118 to the endpoint 144, the endpoint 144 must successively return an RSVP reservation message (RSVP RESV) to the endpoint 118 in order for a flow to be initiated. The endpoint 144 forwards the RSVP RESV to the PEP 108. The RSVP RESV specifies traffic characteristics such as token rate and peak rate. The PEP receives the RSVP RESV and then issues a Request message type RESV (REQ RESV) to the PDP 112. The PDP 112 determines that the data flow is an egress data flow relative to the PDP 112, administers policy rules, adjusts network utilization level information for the corresponding group and RLAP, and installs a reservation state. If no policy rules are violated, the PDP 112 returns DEC Install to the PDP 108. In response to receiving the DEC Install from the PDP 112, the PEP 108 acknowledges the decision by sending a report commit (RPT Commit) to the PDP 112, and then the PEP 108 forwards the RSVP RESV to the PEP 104. As a result, the PDP 112 updates or adjusts the egress network utilization information for the RLAP 152 and the group 166 corresponding to the endpoint 144. Then, the PEP 104 sends REQ RESV to the PDP 110. The PDP 110 determines that the data flow is an ingress data flow relative to the PDP 110, applies policy rules, adjusts the network utilization level information for the corresponding RLAP 146 and group 154 if none of the policy rules are violated, and installs the reservation state. Then, the PDP 110 sends a DEC Install to the PEP 104 and updates the ingress network utilization information for the RLAP 146 and the group 154 corresponding to the endpoint 118. In turn, the PEP 104 returns an RPT Commit to the PDP 110, forwards the RSVP RESV to the endpoint 118, and a successful flow is established from the endpoint 118 to the endpoint 144.

Figure 10:
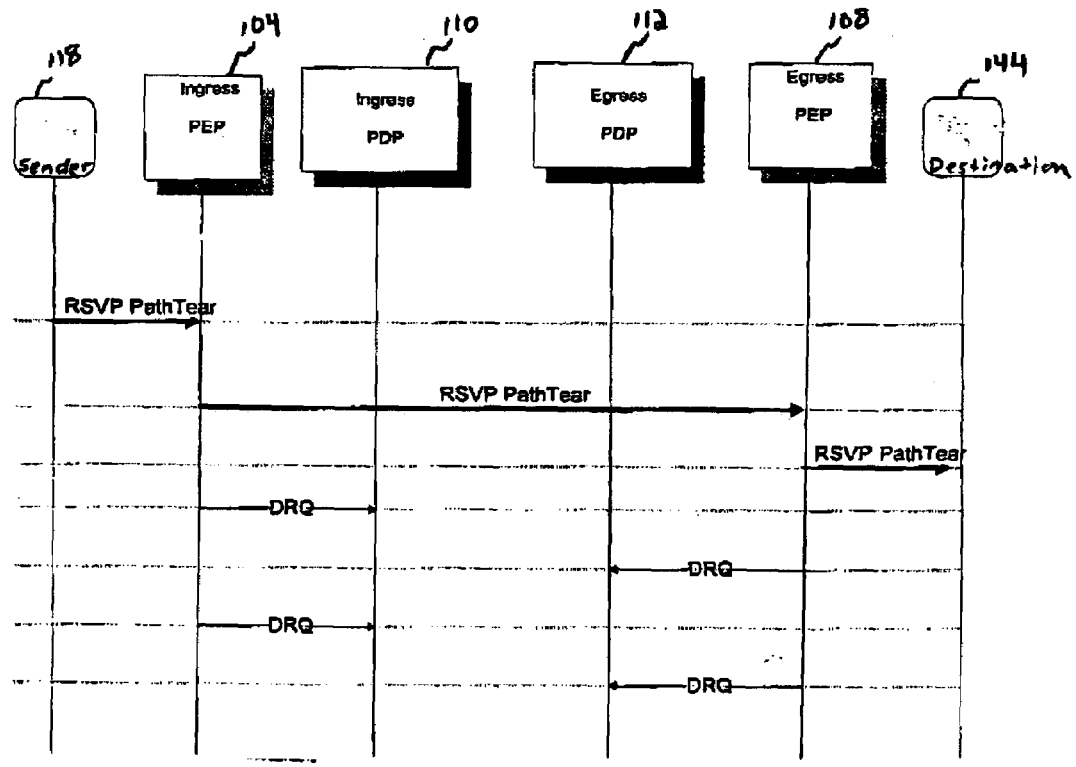
FIG. 10 is a schematic illustration showing how a data flow between two endpoints is terminated, using RSVP signaling.
Figure 11:
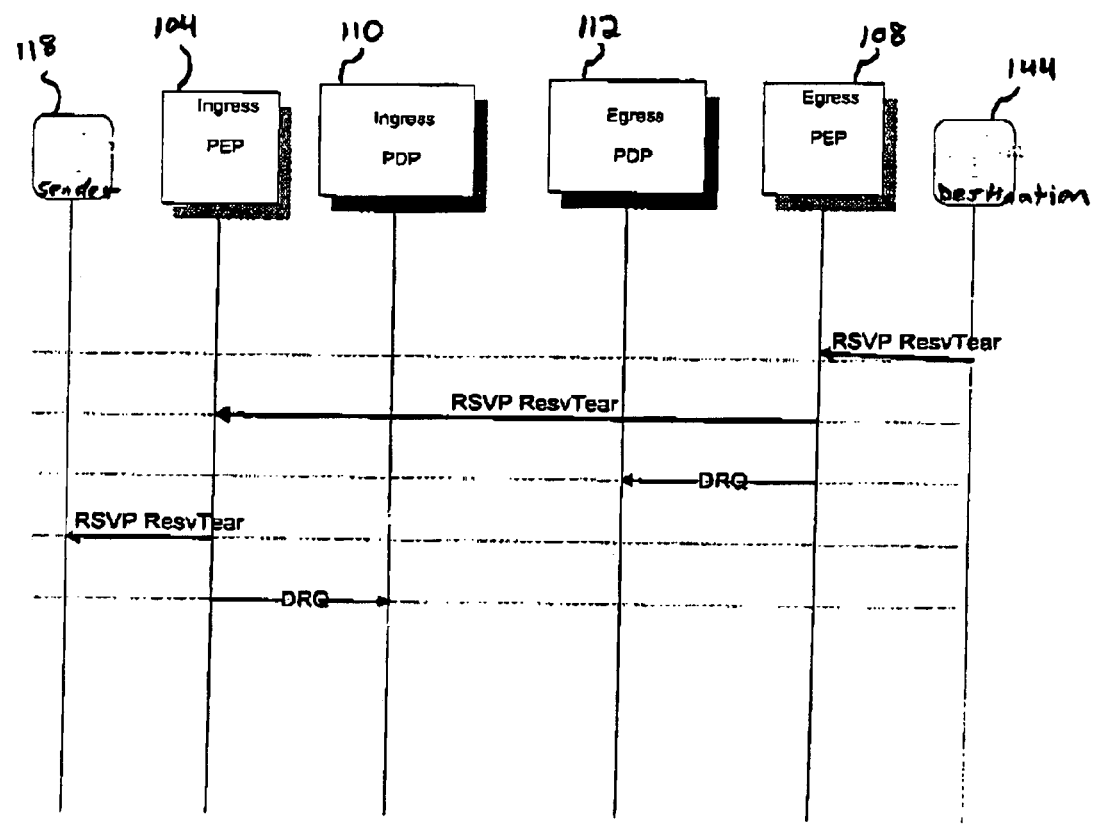
FIG. 11 is a schematic illustration showing another way in which a data flow may be terminated between two endpoints, using RSVP signaling.

FIGS. 10 and 11 are schematic illustrations showing exemplary message exchanges for discontinuing the flow established in FIG. 9. FIG. 10 shows how a path is discontinued (i.e., how a path teardown is performed). An RSVP PathTear message is initiated by the endpoint 118. The RSVP PathTear message can also be initiated by a router, such as one of the PEPs 104 and 108. The PEP 104 receives the RSVP PathTear request from the endpoint 118. The PEP 104 forwards the RSVP PathTear message to the PEP 108. The PEP 108 forwards the RSVP PathTear message to the endpoint 144. When the RSVP PathTear message is received at the PEP 104, a delete request state (DRQ) is sent from the PEP 104 to the PDP 110 for the corresponding path state. The PDP removes the associated state upon receiving the DRQ. Likewise, when the PEP 108 receives the RSVP PathTear message from the PEP 104, the PEP 108 issues a DRQ to the PDP 112. Regardless of the architecture and/or specific protocol used, a teardown may be used to initiate the adjustment of the network utilization levels.

FIG. 11 is a schematic illustration showing exemplary message exchanges involved in a successful teardown of a reservation state. The endpoint 144 initiates a RSVP ResvTear message, which is sent to the PEP 108. Alternatively, the RSVP ResvTear message can be initiated by an RSVP router, such as the PEP 104 or the PEP 108. Upon receiving the RSVP ResvTear message from the endpoint 144, the PEP 108 forwards the RSVP ResvTear message to the PEP 104 and issues a DRQ to the PDP 112. Upon receiving the RSVP ResvTear message from the PEP 108, the PEP 104, forwards the RSVP ResvTear message to the endpoint 118 and issues a DRQ to the PDP 110. Upon receiving the respective DRQs, the PDPs 110 and 112 remove the associated reservation states.

When the PDPs 110 and 112 receive a DRQ request, the PDPs 110 and 112 adjust the network utilization level information for the corresponding RLAPs and groups to reflect the resulting increase in the availability of network resources. In this manner, the group and RLAP utilization tables are tracked and updated. As with the creation of a successful path, any suitable protocol language may be used to discontinue the flow between the endpoints 118 and 144. As long as the PDPs 110 and 112 receive a message indicating that the data flow has ended, the PDPs 110 and 112 can update, and thereby track, the RLAP and group network utilization levels.

Figure 12:
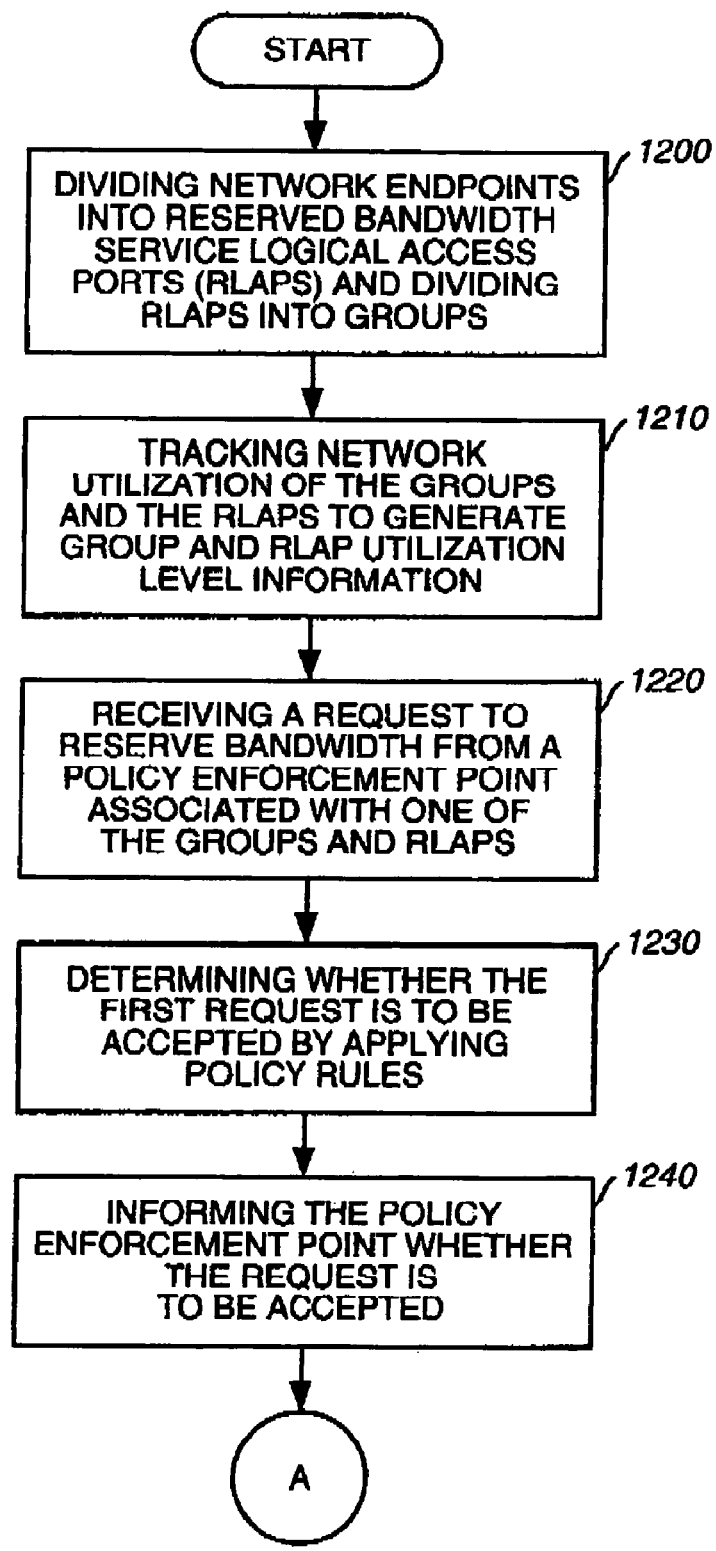
FIGS. 12 and 13 are flow charts showing a process for implementing a customer resources policy control for IP traffic delivery.
Figure 13:
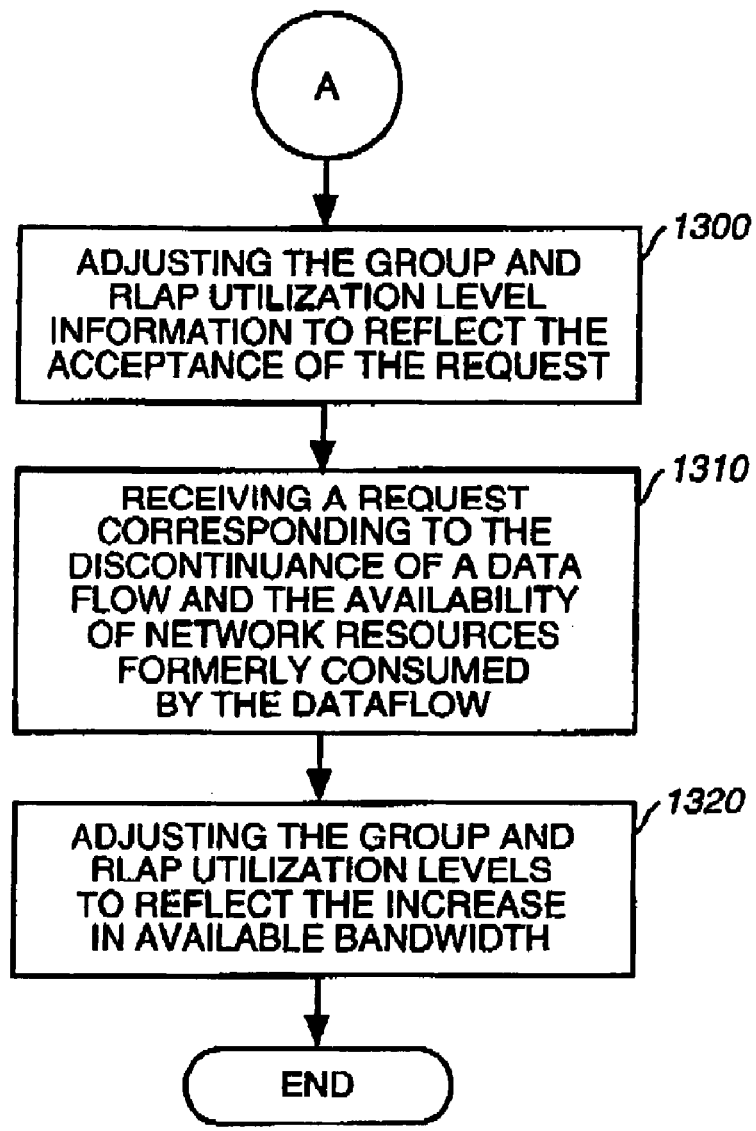

FIGS. 12 and 13 are flow charts describing the process for implementing a customer resources policy control for IP traffic delivery. In step 1200 the endpoints 118–144 of the computer network 100 are divided into RLAPs 146, 148, 150 and 152. The RLAP 146 is divided into groups 154 and 156. The RLAP 148 is divided into groups 158 and 160. The RLAP 150 forms a single group 162. The RLAP 152 is divided into groups 166 and 164. Preferably, the groupings into RLAPs and groups are logical. Moreover, the groups and RLAPS are not necessarily constrained by the physical topology of the network. For example, the groups can correspond to the endpoints in a single building or city, and the RLAPs can correspond to a particular customer of the administrative domain 102.

Next, in step 1210 the network utilization of the groups and the RLAPs is tracked to generate group and RLAP utilization level information. The group and RLAP utilization level corresponds to the current amount of network resource consumption by the groups and RLAPS, respectively. The network utilization of the groups is tracked using information stored in group utilization records such as the group utilization record 700. Likewise, the network utilization level of the RLAPs is tracked using information stored in RLAP utilization records such as the RLAP utilization record 800. The network utilization levels are adjusted as the PDPs 110 and 112 receive messages from the PEPs 104 and 108 indicating that flows are being created or discontinued.

In step 1220, a PDP (e.g., the PDP 110) receives a request for network resources (e.g., a request to reserve bandwidth) for a flow. This request is preferably received, from a PEP (e.g., the PEP 104), which is associated with RLAP 146 and groups 154 and 156, but may also be received from any device for making flow requests.

Then, in step 1230, the PDP 110 determines whether the request for network resources is to be accepted by applying at least one policy rule. The policy rules are applied based on the group and RLAP utilization level information stored in the corresponding group utilization record 700 and RLAP utilization record 800, information identifying the group and RLAP associated with the endpoint making the request (obtained from the access profile record 300, for example), and predetermined profiles for the corresponding group and RLAP stored in the corresponding group profile record 400 and RLAP profile record 500.

Next, in the step 1240 the PDP 110 informs the PEP 104 of the result of the determination whether to grant the request for network resources for the sender.

Assuming the request for network resources and for establishment of a data flow is accepted by the PDP 110, the group and RLAP utilization levels are adjusted to reflect the acceptance of the request and the decrease in available bandwidth for the corresponding group and RLAP in step 1300, as shown in FIG. 13. Once the data flow is discontinued, the PDP 110 receives a request corresponding to the discontinuance of the flow in step 1310. Then, in step 1320, the PDP adjusts the group and RLAP utilization levels to reflect the corresponding increase in the network resources that are available for the RLAP and the group.

Figure 14:
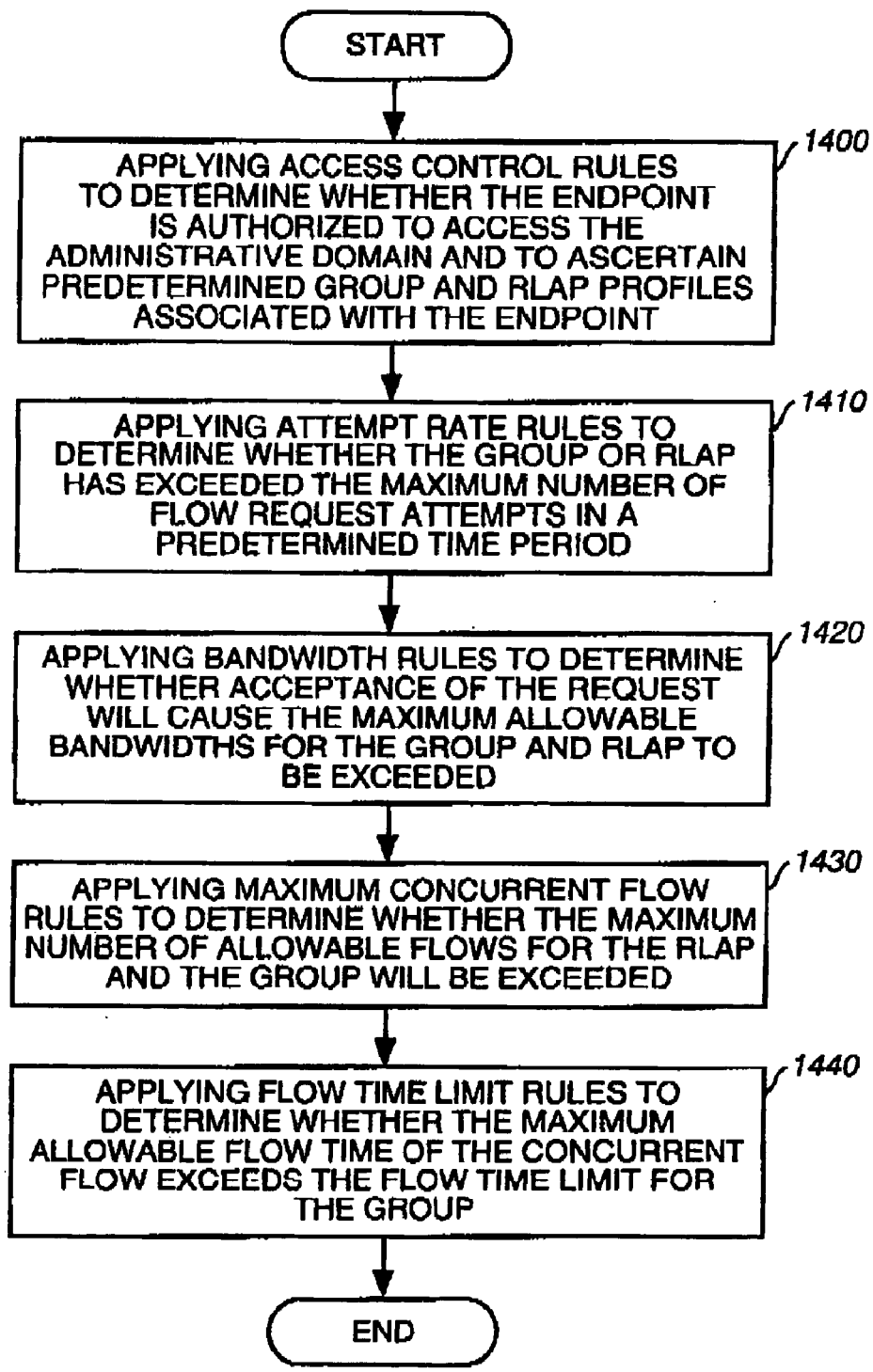
FIG. 14 is a flow chart showing a process for applying policy rules to control customer resources on the computer network in FIG. 1B.

FIG. 14 is a flow chart showing how the policy rules are applied in step 1230 of FIG. 12. In step 1400 an access control rule is applied to determine whether the endpoint making the request is authorized for network ingress and/or egress and to ascertain which group and RLAP profile records are associated with the endpoint. This is possible because the endpoint address prefix is sent to the PDP corresponding to the PEP from which the request originates. The PDP examines its access control records to determine whether there is an access control record (e.g., the access control record 200) having an endpoint address prefix that matches the endpoint making the request. Each access control record includes prefix bits information which indicates the number of significant digits to be examined in comparing the endpoint IP addresses with the endpoint address prefixes stored in the access control records. If a match is found, (i.e., if an access control record 200 exists for the endpoint making the request), then the access ID is obtained from the access control record 200 for that endpoint. The access ID is used to find the corresponding access profile record (e.g., the access profile record 300). When an access profile record having the same access ID as the access control record is found, the IP address of the PEP originating the request (i.e., the ingress PEP IP address) is used to determine the RLAP ID and the group ID associated with the endpoint making the request. This is possible because the ingress PEP IP address is linked to the corresponding RLAP ID and group ID in the access profile record. If the sending endpoint is not authorized, the destination endpoint IP address can be examined to determine whether there is an access control record corresponding to the endpoint IP address. If an access control record 200 is found for the destination and the IP address for the PEP originating the request, i.e., the ingress PEP IP address (listed in the destination endpoints' access profile record), the access control rule is not violated. The access control rule is violated or fails when the sender has no access control record, or both the sender and the destination have an access control record but neither has an access profile record with an ingress PEP IP address that matches the PEP IP address of the PEP originating the request.

When the access control rule fails, the request is denied and no further rules need to be examined. A feature of the access control rule is that the PEP that the PDP is serving can be determined. This information is used for subsequent application of policy rules that are dependent upon the identification of the corresponding PEP, RLAP, and/or group. Using the prefix bits information, the endpoint address prefix, and the access control records, a longest prefix, match can be used to find the access control record corresponding to the sender. Further, the PDP can determine whether it is an ingress access point or an egress access point during the application of the access control rule. Specifically, if the sender has an access control record and the PEP originating the request is listed as an ingress PEP IP address in the access profile record corresponding to the sender, then the PDP is an ingress access point. The PDP is an egress access point in the following circumstances: (1) it is not the ingress access point, (2) the destination has an access control record, and (3) the PEP originating the request has an IP address listed in the destination's access profile record. The PDP may also serve as both an ingress access point and an egress access point for a particular request.

In step 1410 of FIG. 14, an attempt rate rule is applied. The attempt rate rule is invoked by a new path request. The PDP ascertains the maximum attempt rates in the RLAP and group profile records 500 and 400, respectively. The appropriate RLAPs and groups are identified during the application of the access control rule, as noted above. A quantum window algorithm can be used, making it unnecessary to continuously monitor the number of attempts. The quantum window algorithm is an algorithm applied inline during attempt rate feature processing. At each align time interval, a counter is refreshed with the attempt value defined for the respective group and RLAP. Each time the attempt rate feature is executed, the difference between the current time and the last align time is compared with the configured attempt rate time period. If the difference is less than the attempt rate time period the counter is decremented, otherwise the counter is refreshed with the predefined number of attempts and the last align time is updated with the current time. If the maximum rate is not exceeded, the request passes the attempt rate rule, otherwise the attempt rate rule is violated and the request fails. The attempt rate rule is applied to the RLAP first and then to the group. However, this ordering may be switched if desired.

Alternatively, the path request attempts for the group and the RLAP can be separately tracked and stored in the corresponding group utilization record and the RLAP utilization record, respectively. If the attempts stored in the group utilization record exceed the maximum attempt rate stored in the group profile record, then the attempt rate rule is violated. Likewise, if the number of attempts stored in the RLAP utilization record exceeds the maximum attempt rate in the RLAP profile record, then the attempt rate rule is violated. The attempt totals stored in the RLAP utilization record and the group utilization record may be reset periodically so that the attempts represent the attempts per a predetermined amount of time defined by the length of time from the last reset.

In step 1420 bandwidth rules are applied to determine whether acceptance of a path or reservation request would cause the maximum allowable bandwidths for the group and RLAP to be exceeded. The bandwidth rule is invoked in response to a path request and in response to a reservation request. In this manner, a bandwidth corresponding to ingress and egress data flows are separately monitored. The different bandwidth rules may be applied separately or in any desirable combination and in any order. The first bandwidth rule determines whether a data flow's requested traffic characteristics exceed a predetermined limit (i.e., the ingress token rate limit or the egress token rate limit, depending upon whether the PDP is an ingress or an egress access point) for the corresponding group profile record 400 and RLAP profile record 500. This check may be performed on an individual flow request level as well as on an aggregate bandwidth usage level for the RLAP and the group. The sender's RLAP and group profile records are used for bandwidth checks at the ingress point, and the destination's RLAP and group profile records are used for bandwidth checks at the egress point. The requested bandwidth data traffic parameters (e.g., peak rate and token rate) are compared against the predetermined limits for the group and for the RLAP, which are stored in the corresponding group utilization record and RLAP utilization record, respectively. If the RLAP limits are exceeded, the request fails and no further rules are applied. Likewise, if the group limits are exceeded, the request fails and no further rules are applied.

The aggregate bandwidth in use by the RLAP is evaluated if the traffic data parameters do not exceed the limits for the individual path request. An adjusted bandwidth request is determined by weighting the ingress token rate limit (or the egress token rate limit, if the PDP is an egress access point) with the amount of additional bandwidth that could potentially affect the available bandwidth. The adjusted bandwidth is the sum of the token rate limit and the weighted peak rate. The weighted peak rate is the difference between the token rate limit and the peak rate limit, multiplied by the ratio of the peak rate to the remaining, unassigned bandwidth. When the peak rate limit is less than or equal to the token rate limit, the token rate limit is used for the adjusted bandwidth request. Thus, the formula for adjusted bandwidth request is as follows:

$$ABR=TR+[(PR-TR)*(PR\backslash UB)],$$

where ABR is the adjusted bandwidth request, TR is the token rate, PR is the peak rate, and UB is the unassigned bandwidth.

The unassigned bandwidth (UB) is the difference between the maximum bandwidth and the bandwidth in use. The available bandwidth is equal to the over-allocation factor multiplied by the unassigned bandwidth. The over-allocation factor is a value that permits the network manager to optimize network resource control by making allowance for the fact that unsignaled requests result in actual flows and let the bandwidth be "over allocated" by granting requests. Over-allocation is analogous to an airline over-booking reservations for a flight. For example, when the network manager determines, via analysis of usage patterns, that 10% of a customer's requests for bandwidth do not result in actual data flows the manager would configure an over-allocation factor of 1.1 for the customer group. The over-allocation factor, if used, may be stored in the group and RLAP profile records in the fields 402 and 502, for example. The available bandwidth is compared to the adjusted bandwidth request. The bandwidth rules are not violated if the adjusted bandwidth request does not exceed the over-allocated, available amount. The adjusted bandwidth request is stored in a flow state record (e.g., the flow state record 600) in the field 644 as part of the bandwidth used information. Additionally, the adjusted bandwidth request added to the RLAP aggregate bandwidth in use, which is stored in the RLAP utilization record (e.g., RLAP utilization record 800) in either the field 810 or the field 812, depending on if the flow is ingress or egress, respectively. The type of flow (i.e., ingress or egress) is determined during access control and is stored in the field 608 of the flow state record when the reservation request is successfully completed.

The aggregate bandwidth in use by the group is evaluated if the traffic data parameters do not exceed the limits stated above for the RLAP. The group aggregate bandwidths are calculated in a similar manner as the RLAP bandwidth aggregate, with the group profile and utilization records being used instead of the RLAP profile and utilization records. Regardless of whether the bandwidth feature is authorized and activated or not, the adjusted rate request is stored along with the flow state information (bandwidth used in field 644), and the adjusted rate request is accounted for in the determination of the aggregate bandwidth in use.

The profile and utilization information for both the sender and the destination are involved with bandwidth processing on both the RLAP and the group level. The profile and utilization data associated with the sender are used for the ingress bandwidth calculations at the ingress point. The profile and utilization data associated with the destination are used for the egress bandwidth calculations at the egress point.

Upon successful completion of a reservation request, the RLAP and group utilization bandwidth aggregates are adjusted. The requested bandwidth is added to the ingress aggregates of the sender's RLAP and group utilization data at the ingress point. The requested bandwidth is added to the egress aggregates of the destination's RLAP and group utilization data at the egress point. Subsequent requests to change the resource requirements for existing reservations are reflected in the aggregates.

When a data flow is terminated (for example, when a DRQ is received by a PDP), the individual bandwidth associated with a data flow is deducted from the RLAP and group bandwidth aggregates. The ingress aggregates are those values corresponding to the sender of the flow. The egress aggregates are those values corresponding to the destination of the flow. If the requested bandwidth exceeds the ingress maximum bandwidth at the ingress point or exceeds the egress maximum bandwidth at the egress point, the bandwidth rule is violated and the request fails.

In step 1430 maximum concurrent flow rules are invoked. These rules may be invoked in response to a path request and/or in response to a reservation request. The PDP determines whether acceptance of a requested flow would result in the maximum number of concurrent flows being exceeded for both the RLAP and the group. This is performed by comparing the information of the number of active flows stored in the RLAP and group utilization records with the corresponding information of the maximum concurrent flow limits stored in the RLAP and group profile records. Preferably, the maximum concurrent flow rule is applied to the RLAP before being applied to the group; however, any ordering may be used. The maximum concurrent flow rules are applied based on the sender's group profile record (e.g., the group profile record 400), RLAP profile record (e.g., the RLAP profile record 500), group utilization record (e.g., the group utilization record 700), and RLAP utilization record (e.g., the RLAP utilization record 800). If the maximum concurrent flow rule is not violated, the active concurrent flow counts are incremented in the corresponding group and RLAP utilization records to reflect the increase in resource consumption. Regardless of whether the maximum concurrent flow rule is authorized and activated or not, the concurrent active flows count is preferably incremented for a successful reservation request. When a path is discontinued and a DRQ is received by PDP, the active concurrent flow counts are decremented for both the group and RLAP utilization records to reflect the decrease in resource consumption.

In step 1440 of FIG. 14, flow time limit rules are applied to determine whether the maximum allowable flow time of an existing data flow exceeds the flow time limit for the group. Alternatively, the flow time limit rule may be applied to the RLAP or to both the group and RLAP. The flow time limit rule is invoked upon confirmation of a successful reservation request. Upon confirmation of a new reservation request at the ingress PEP, a flow time limit timer for the reservation request is started. A subsequent request to change a reservation does not reset or impact the timer for the flow. Likewise, a subsequent reservation error request does not reset or impact the timer for the flow. The flow is periodically monitored during its existence by the ingress PDP to determine whether its duration has exceeded the predetermined flow time limit stored in the group profile record corresponding to the sender. If the data flow is active for a length of time exceeding the flow time limit, the ingress PDP changes the flow state to "expired" and issues an unsolicited decision message instructing the corresponding PEP to remove the flow.

Accordingly, it can be appreciated that the present invention provides a customer resources policy control for IP traffic delivery. Policy rules are implemented on a per customer basis, as defined by the groups and RLAPs of the computer network.

In most of the examples provided above, the invention was described in terms of IETF architecture using COPS and RSVP protocols. However, any suitable protocols may be used concurrently with, or in place of, COPS and/or RSVP protocols. Moreover, all or a portion of the invention may be conveniently implemented using conventional general purpose computers or microprocessors programmed according to the teachings of the present invention, as will be apparent to those skilled in the computer art. Appropriate software can be readily prepared by programmers of ordinary skill based on the teachings of the present disclosure, as will be apparent to those skilled in the software art.

Figure 15:
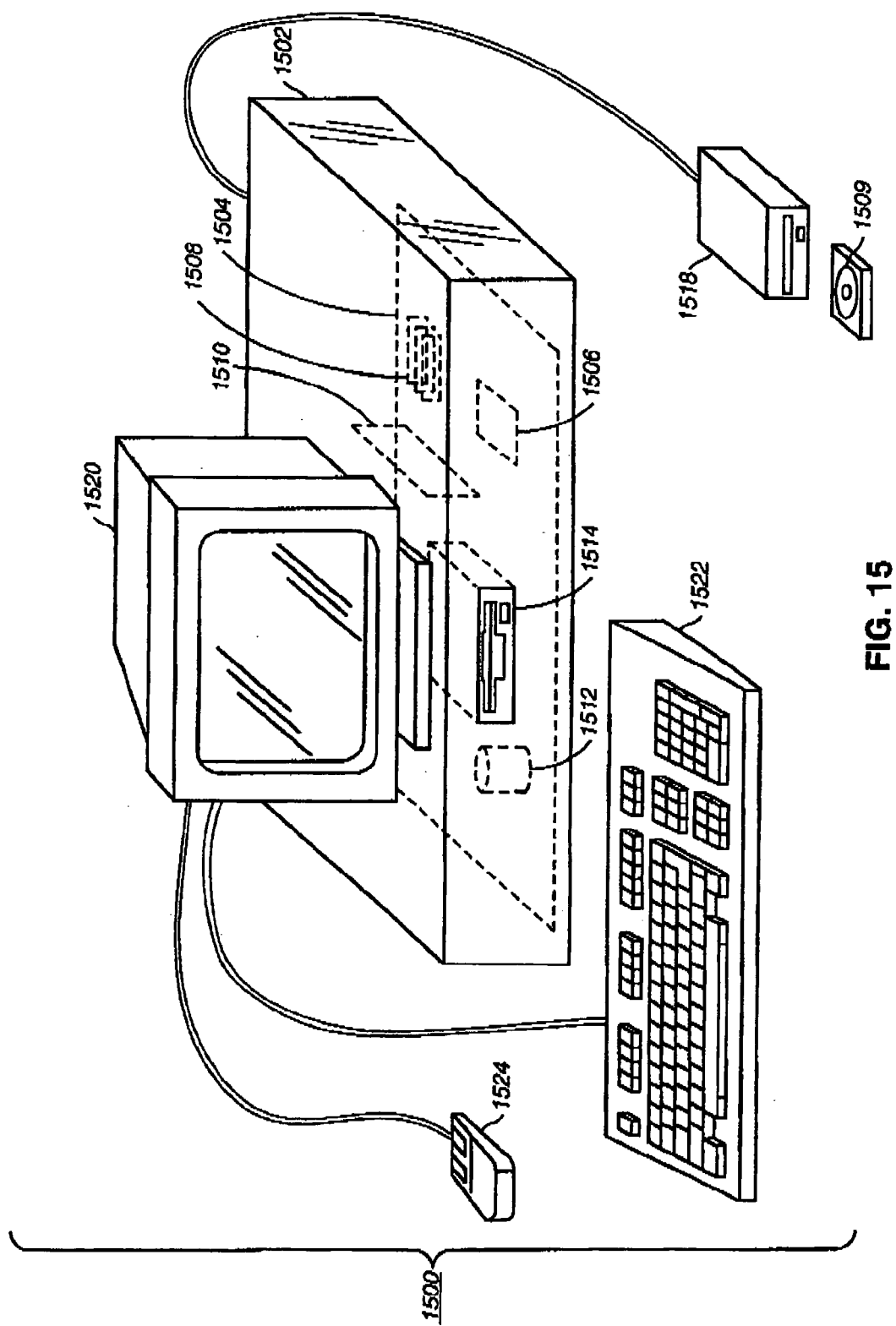
FIG. 15 is a schematic diagram of a general purpose computer system that can be programmed to perform the special purpose function(s) of one or more of the devices shown in the computer network in FIG. 1B.

FIG. 15 is a schematic illustration of a computer system 1500 for implementing the method of the present invention. The computer system 1500 includes a computer housing 1502 for housing a mother board 1504, which contains a CPU 1506, a memory 1508 (e.g., random access memory (RAM) dynamic RAM (DRAM), static RAM (SRAM), synchronous DRAM (SDRAM), flash RAM, read-only memory (ROM), programmable ROM (PROM), erasable PROM (EPROM), and electrically erasable PROM (EEPROM)), and other optional special purpose logic devices (e.g., application specific integrated circuits (ASICs)) or configurable logic devices (e.g., generic array of logic (GAL) or reprogrammable field programmable gate arrays (FPGAs)). The computer system 1500 also includes plural input devices, such as a keyboard 1522 and a mouse 1524, and a display card 1510 for controlling a monitor 1520. In addition, the computer system 1500 further includes a floppy disk drive 1514; other removable media devices (e.g., a compact disc 1519, a tape, and a removable magneto-optical media); and a hard disk 1512, or other fixed, high density media drives, connected using an appropriate device bus (e.g., a small computer system interface (SCSI) bus, and enhanced integrated device electronics (IDE) bus, or an ultra-direct memory access (DMA) bus). The computer system 1500 may additionally include a compact disc reader 1518, a compact disc reader-writer unit, or a compact disc juke box, each of which may be connected to the same device bus or another device bus. Although the compact disc 1519 is shown in a CD caddy, the compact disc 1519 can be inserted directly into CD-ROM drives which do not require caddies. In addition, a printer may provide printed listings of the data structure shown in FIGS. 2–8 or any other data stored and/or generated by the computer system 1500.

As stated above, the system includes at least one computer readable medium or memory programmed according to the teachings of the invention and for containing data structures, tables, records, or other data described herein. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 1500 and for enabling the computer 1500 to interact with a human user (e.g., a consumer). Such software may include, but is not limited to, device drivers, operating systems and user applications, such as development tools. Such computer readable media further includes the computer program product of the present invention for performing all or a portion (if processing is distributed) of the processing performed in implementing the invention. The computer code devices of the present invention can be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

APPENDIX A

GLOSSARY OF TERMS AND ABBREVIATIONS

Access Point—The access point is the point that a data flow enters or exits the administrative domain.

Address Prefix—An address prefix is the leading portion of an IPv4 address or IPv6 address, plus an integer defining the number of leading bits to use in longest match comparisons. Address Prefix's do not overlap Groups.

DEC Install—DEC Install is a COPS decision operation that signifies the request is granted. This results in the PEP installing state for the flow associated with the request.

DEC Remove—DEC Remove is a COPS decision operation that signifies the request is denied. The PEP does not install state for the flow requested with the request.

Decision—A Decision is a response sent from PDP to PEP based on administrative rules.

DRQ—Delete Request State. A DRQ is a COPS operation where the PEP sends the DRQ to the PDP that indicates that the state associated with the request is to be removed. This is sent in the case of teardown.

Egress—An egress is the sender's exit, or departure point from the administrative domain. Since RSVP is unidirectional, the egress point is always from the sender's perspective; however, the sender's egress point would be the destination's ingress point.

Egress Bandwidth—Egress bandwidth is the bandwidth utilized by the destination of a flow.

Endpoint—An endpoint is the RSVP host sender or destination and is designated by an IPv4 or IPv6 address. Endpoints can access the network through multiple routers.

Flow—A flow is a particular data flow between a sender and a destination.

Ingress Bandwidth—The ingress bandwidth is the bandwidth utilized by the sender of a flow.

Group—A group is a set of endpoints that share the same rules as designated by the Group Profile. Multiple groups can be designated within a RLAP. A group can consist of one or more members.

Ingress—Ingress is the sender's entrance, or access point into the administrative domain. Since RSVP is unidirectional, the ingress point is always from the sender's perspective; however, the sender's ingress point would be the destination's egress point.

Path—Path is an RSVP operation sent by the sender to the receiver requesting a reservation. It follows the same route that the data flow of the reservation is to follow.

Peak Rate—Peak rate is the number of continuous, uninterrupted bytes per second that are transmitted. Thus, peak rate is the instantaneous byte rate or an approximation thereof.

Policy—A policy is the combination of rules ans services where rules define the criteria for resource access and usage.

PEP—Policy Enforcement Point. A PEP is where policy decisions are actually enforced.

PDP—Policy Decision Point. A PDP is where policy decisions are made.

RBS—Reserved Bandwidth Service. An RBS is a service utilizing administrative policy rules to restrict access to an administrative domain.

Report—A Report is a message sent from PEP to PDP which notifies PDP of a condition on the PEP.

Request—A Request is a message sent from PEP to PDP which makes some request on behalf of an RSVP flow.

Reservation—A reservation is an RSVP operation sent by the receiver to the sender to reserve network resources at each node along a path between the receiver and the sender.

REQ PATH—REQ PATH is a COPS operation that is sent by the PEP to the PDP that is making a policy request that contains RSVP Path message information.

REQ RESV—REQ RESV is a COPS operation that is sent by the PEP to the PDP that is making a policy request that contains RSVP Reservation message information.

RESV STATE—RESV STATE is the state associated with the reservation of an RSVP data flow. The reservation state is associated with allocating with network resources required for the RSVP flow.

RLAP—RBS Logical Access Port. An RLAP is a logical grouping of IPv4 or IPv6 addresses. Multiple RLAPs can be designated for a PEP. RLAP address groupings apply to one PEP. Preferably, all endpoints in an RLAP are capable of accessing the administrative domain through the same PEP.

RPT Commit—RPT Commit is a COPS operation that the PEP sends to the PDP that acknowledges the installation of the state associated with the preceding DEC Install sent by the PDP to the PEP.

RSVP—Resource Reservation Protocol.

RSVP PATH—RSVP PATH is the RSVP operation sent by the sender to a receiver requesting that a reservation for a path be established.

RSVP PATHTEAR—RSVP PATHTEAR is the RSVP operation sent by the sender towards the receiver indicating that the data flow is terminated.

RSVP RESVTEAR—RSVP RESVTEAR is the RSVP operation sent by the receiver towards the sender indicating that data flow is terminated.

Session—A session is a data flow (e.g., an RSVP data flow) with a particular destination and transport-layer protocol. It is defined by the five tuple: (DestAddress, ProtocolId, DestPort, SrcAddress, SrcProt).

State—State is information specific to an entity (e.g. a data flow) that reflects a stage or phase.

Token Rate—Token rate is the sustained number of bytes per second that are transmitted. Thus, the token rate is the average byte rate.

What is claimed is:

1. A method for controlling customer resources for network traffic delivery, comprising:
   tracking network utilization of a group of endpoints on a network to generate group utilization level information corresponding to a current amount of network resource consumption by the group;
   receiving a message corresponding to a request for network resources for a data flow for one of the endpoints, the request including an identifier associated with the one endpoint and being from one of a router and a packet switch, associated with the one endpoint, said one of the router and the packet switch is a policy enforcement point (PEP);
   determining whether the request is accepted based on the group utilization level information, the identifier, and a predetermined profile, the predetermined profile being associated with the group and including a network utilization limit;
   forwarding to said one of the router and the packet switch the result of the decision whether to accept the request; and
   performing the steps of tracking, receiving, and determining on a server that forms a policy decision point independent of said PEP.

2. The method of claim 1, wherein the step of determining comprises the step of:
   applying a policy rule, using the group utilization level information, the identifier, and the predetermined profile to determine whether the group exceeds the network utilization limit.

3. The method of claim 2, wherein the policy rule in the step of applying comprises:
   an access control rule, an attempt rate rule, a bandwidth rule, a maximum concurrent flow rule, and a flow time limit rule.

4. The method of claim 1, wherein the group is associated with a reserved bandwidth service logical access port (RLAP) and the method further comprises the step of:
   tracking network utilization of the RLAP, the RLAP including the one endpoint to generate RLAP utilization level information corresponding to a current amount of network resource consumption by the RLAP; and
   wherein the step of determining comprises the step of:
      determining whether the request is to be accepted based on the RLAP utilization level information and another predetermined profile that is associated with the group, includes a corresponding network utilization limit.

5. The method of claim 1, further comprising the step of:
   adjusting the group utilization level information, when the request is accepted, to reflect the installment of the request and the corresponding increase in network resources consumption.

6. The method of claim 5, further comprising the steps of:
   receiving another message corresponding to a discontinuance of the data flow and to the availability of network resources formerly consumed by the data flow; and
   adjusting the group utilization level information to reflect the availability of the network resources formerly consumed by the data flow.

7. A system for controlling customer resources for network traffic delivery, comprising:
   means for tracking network utilization of a group of endpoints on a network to generate group utilization level information corresponding to a current amount of network resource consumption by the group;
   means for receiving a message corresponding to a request for network resources for a data flow for one of the endpoints, the request including an identifier associated with the one endpoint and being from one of a router and a packet switch associated with the one endpoint, said one of the router and the packet switch is a policy enforcement point (PEP);
   means for determining whether the request is to be accepted based on the group utilization level information, the identifier, and a predetermined profile, the predetermined profile being associated with the group and including a network utilization limit;
   means for forwarding to said one of the router and the packet switch the result of the decision whether to accept the request; and
   a server forming a policy decision point independent of said PEP, said server including the means for tracking, the means for receiving, and the means for determining.

8. The system of claim 7, wherein the means for determining comprises:
   means for applying a policy rule, using the group utilization level information, the identifier, and the predetermined profile to determine whether the group exceeds the network utilization limit.

9. The system of claim 8, wherein the policy rule comprises:
   an access control rule, an attempt rate rule, a bandwidth rule, a maximum concurrent flow rule, and a flow time limit rule.

10. The system of claim 7, wherein the group is associated with a reserved bandwidth service logical access port (RLAP), said RLAP including the group; and
wherein the system further comprises:
means for tracking network utilization of the RLAP, the RLAP including the one endpoint to generate RLAP utilization level information corresponding to a current amount of network resource consumption by the RLAP; and
wherein the means for determining further comprises:
means for determining whether the request is to be accepted based on the RLAP utilization level information and another predetermined profile that is associated with the group includes a corresponding network utilization limit.

11. The system of claim 7, further comprising:
means for adjusting the group utilization level information, when the request is accepted, to reflect the installment of the request and the corresponding increase in network resources consumption.

12. A computer readable medium storing program instructions for execution on a computer system, which when executed by a computer, causes the computer to perform the steps of:
tracking network utilization of a group of endpoints on a network to generate group utilization level information corresponding to a current amount of network resource consumption by the group;
receiving a message corresponding to a request for network resources for a data flow for one of the endpoints, the request including an identifier associated with the one endpoint and being from one of a router and a packet switch associated with the one endpoint, said one of the router and the packet switch is a policy enforcement point (PEP);
determining whether the request is to be accepted based on the group utilization level information, the identifier, and a predetermined profile, the predetermined profile being associated with the group and including a network utilization limit;
forwarding to the router the result of the decision whether to accept the request; and
causing the computer to form a policy decision point independent of said PEP.

13. The computer readable medium of claim 12, wherein the step of determining comprises the step of:
applying a policy rule, using the group utilization level information, the identifier, and the predetermined profile to determine whether the group exceeds the network utilization limit.

14. The computer readable medium of claim 13, wherein the policy rule in the step of applying comprises:
an access control rule, an attempt rate rule, a bandwidth rule, a maximum concurrent flow rule, and a flow time limit rule.

15. The computer readable medium of claim 12, wherein the group is associated with a reserved bandwidth service logical access port (RLAP), and the computer readable medium further includes program instructions for causing the computer to perform the step of:
tracking network utilization of the RLAP, the RLAP including the endpoint to generate RLAP utilization level information corresponding to a current amount of network resource consumption by the RLAP; and
wherein the step of determining comprises the step of:
determining whether the request is to be accepted based on the RLAP utilization level information and another predetermined profile that is associated with the group includes a corresponding network utilization limit.

16. The computer readable medium of claim 12, wherein the computer readable medium further includes program instructions for causing the computer to perform the step of:
adjusting the group utilization level information, when the request is accepted, to reflect the installment of the request and the corresponding increase in network resources consumption.

17. The computer readable medium of claim 16, wherein the computer readable medium further includes program instructions for causing the computer to perform the steps of:
receiving another message corresponding to a discontinuance of the data flow and to the availability of network resources formerly consumed by the data flow; and
adjusting the group utilization level information to reflect the availability of the network resources formerly consumed by the data flow.

* * * * *